US010275117B2

(12) United States Patent
Zambetti et al.

(10) Patent No.: US 10,275,117 B2
(45) Date of Patent: Apr. 30, 2019

(54) USER INTERFACE OBJECT MANIPULATIONS IN A USER INTERFACE

(71) Applicant: Apple Inc., Cupertino, CA (US)

(72) Inventors: Nicholas Zambetti, San Francisco, CA (US); Imran Chaudhri, San Francisco, CA (US); Jonathan R. Dascola, San Francisco, CA (US); Alan C. Dye, San Francisco, CA (US); Christopher Patrick Foss, San Francisco, CA (US); Aurelio Guzman, San Jose, CA (US); Chanaka G. Karunamuni, San Jose, CA (US); Duncan Robert Kerr, San Francisco, CA (US); Stephen O. Lemay, Palo Alto, CA (US); Natalia Maric, San Francisco, CA (US); Christopher Wilson, San Francisco, CA (US); Eric Lance Wilson, San Jose, CA (US); Lawrence Y. Yang, San Francisco, CA (US); Gary Ian Butcher, San Jose, CA (US); Jonathan P. Ive, San Francisco, CA (US)

(73) Assignee: Apple Inc., Cupertino, CA (US)

(*) Notice: Subject to any disclaimer, the term of this patent is extended or adjusted under 35 U.S.C. 154(b) by 341 days.

(21) Appl. No.: 14/913,350

(22) PCT Filed: Sep. 3, 2014

(86) PCT No.: PCT/US2014/053958
§ 371 (c)(1),
(2) Date: Feb. 19, 2016

(87) PCT Pub. No.: WO2015/034966
PCT Pub. Date: Mar. 12, 2015

(65) Prior Publication Data
US 2016/0231883 A1 Aug. 11, 2016

Related U.S. Application Data

(63) Continuation-in-part of application No. 14/476,657, filed on Sep. 3, 2014, now abandoned.
(Continued)

(51) Int. Cl.
G06F 3/0482 (2013.01)
G06F 1/16 (2006.01)
(Continued)

(52) U.S. Cl.
CPC .......... G06F 3/0482 (2013.01); G06F 1/163 (2013.01); G06F 1/169 (2013.01); G06F 3/0362 (2013.01);
(Continued)

(58) Field of Classification Search
CPC ........ G06F 1/163; G06F 1/169; G06F 3/0362; G06F 3/048–3/04897; G06F 2203/04802; G06T 13/80
See application file for complete search history.

(56) References Cited

U.S. PATENT DOCUMENTS 4,395,134 A 7/1983 Luce
5,088,070 A 2/1992 Shiff
(Continued)

FOREIGN PATENT DOCUMENTS

CN 1330310 A 1/2002
CN 1398366 A 2/2003
(Continued)

OTHER PUBLICATIONS

Office Action received for Taiwanese Patent Application No. 103130520, dated Oct. 1, 2015, 58 pages (22 pages of English translation and 36 pages of Official copy).
(Continued)

Primary Examiner — Kieu D Vu
Assistant Examiner — Alvaro R Calderon, IV
(74) Attorney, Agent, or Firm — Dentons US LLP

(57) ABSTRACT

Systems and processes for manipulating a graphical user interface are disclosed. One process can include receiving user input through a crown to rotate a virtual object. The process includes selecting a surface of the object from among the multiple surfaces of the object in response to determining that the crown rotation exceeded a speed threshold.

61 Claims, 26 Drawing Sheets

Related U.S. Application Data

(60) Provisional application No. 61/873,359, filed on Sep. 3, 2013, provisional application No. 61/959,851, filed on Sep. 3, 2013, provisional application No. 61/873,360, filed on Sep. 3, 2013, provisional application No. 61/873,356, filed on Sep. 3, 2013.

(51) Int. Cl.
*G06T 13/80* (2011.01)
*G06F 3/0362* (2013.01)
*G06F 3/0484* (2013.01)
*G06F 3/0481* (2013.01)

(52) U.S. Cl.
CPC ........ *G06F 3/0481* (2013.01); *G06F 3/04845* (2013.01); *G06T 13/80* (2013.01); *G06F 2203/04802* (2013.01)

(56) References Cited

U.S. PATENT DOCUMENTS

| | | | |
|---|---|---|---|
| 5,313,229 A | 5/1994 | Gilligan et al. | |
| 5,477,508 A * | 12/1995 | Will | G04G 21/00 368/189 |
| 5,519,393 A | 5/1996 | Brandestini | |
| 5,528,260 A | 6/1996 | Kent | |
| 5,691,747 A | 11/1997 | Amano | |
| 5,739,775 A | 4/1998 | Brandestini | |
| 5,825,353 A * | 10/1998 | Will | G06F 1/1626 345/184 |
| 5,852,413 A | 12/1998 | Bacchi et al. | |
| 5,874,961 A | 2/1999 | Bates et al. | |
| 5,903,229 A | 5/1999 | Kishi | |
| 5,940,521 A | 8/1999 | East et al. | |
| 5,960,366 A | 9/1999 | Duwaer | |
| 5,982,710 A | 11/1999 | Rawat et al. | |
| 6,081,256 A * | 6/2000 | Herget | G06F 3/04847 345/157 |
| 6,128,006 A * | 10/2000 | Rosenberg | G01C 21/36 345/161 |
| 6,157,381 A | 12/2000 | Bates et al. | |
| 6,161,957 A * | 12/2000 | Guanter | G04G 21/00 368/185 |
| 6,192,258 B1 | 2/2001 | Kamada et al. | |
| 6,203,190 B1 | 3/2001 | Stotz | |
| 6,266,098 B1 * | 7/2001 | Cove | H04N 5/44513 348/563 |
| 6,297,795 B1 | 10/2001 | Kato et al. | |
| 6,300,939 B1 | 10/2001 | Decker et al. | |
| 6,305,234 B1 | 10/2001 | Thies et al. | |
| 6,323,846 B1 | 11/2001 | Westerman et al. | |
| 6,339,438 B1 | 1/2002 | Bates et al. | |
| 6,396,482 B1 | 5/2002 | Griffin et al. | |
| 6,477,117 B1 | 11/2002 | Narayanaswami et al. | |
| 6,525,997 B1 * | 2/2003 | Narayanaswami | G04G 9/0082 368/223 |
| 6,535,461 B1 | 3/2003 | Karhu | |
| 6,556,222 B1 * | 4/2003 | Narayanaswami | G04G 9/0064 368/295 |
| 6,570,557 B1 | 5/2003 | Westerman et al. | |
| 6,636,197 B1 | 10/2003 | Goldenberg et al. | |
| 6,647,338 B1 | 11/2003 | Hamberger et al. | |
| 6,661,438 B1 * | 12/2003 | Shiraishi | G06F 1/1626 715/781 |
| 6,677,932 B1 | 1/2004 | Westerman | |
| 6,700,564 B2 | 3/2004 | McLoone et al. | |
| 6,720,860 B1 | 4/2004 | Narayanaswami | |
| 6,788,220 B2 | 9/2004 | Netzer et al. | |
| 6,809,724 B1 * | 10/2004 | Shiraishi | G06F 1/163 345/157 |
| 6,842,169 B2 | 1/2005 | Griffin et al. | |
| 6,967,642 B2 | 11/2005 | SanGiovanni | |
| 6,967,903 B2 | 11/2005 | Guanter | |
| 7,046,230 B2 | 5/2006 | Zadesky et al. | |
| 7,058,904 B1 * | 6/2006 | Khan | G06F 3/0489 715/822 |
| 7,075,513 B2 | 7/2006 | Silfverberg et al. | |
| 7,081,905 B1 * | 7/2006 | Raghunath | G04G 5/00 345/684 |
| 7,116,317 B2 | 10/2006 | Gregorio et al. | |
| 7,130,664 B1 | 10/2006 | Williams | |
| 7,143,355 B2 | 11/2006 | Yamaguchi et al. | |
| 7,146,005 B1 | 12/2006 | Anft et al. | |
| 7,168,047 B1 | 1/2007 | Huppi | |
| 7,227,963 B1 | 6/2007 | Yamada et al. | |
| 7,256,770 B2 | 8/2007 | Hinckley et al. | |
| 7,272,077 B2 | 9/2007 | Nobs | |
| 7,286,063 B2 | 10/2007 | Gauthey et al. | |
| 7,286,119 B2 | 10/2007 | Yamaguchi et al. | |
| 7,317,449 B2 | 1/2008 | Robbins et al. | |
| 7,333,084 B2 | 2/2008 | Griffin | |
| 7,463,239 B2 | 12/2008 | Ledbetter et al. | |
| 7,469,386 B2 | 12/2008 | Bear et al. | |
| 7,477,890 B1 | 1/2009 | Narayanaswami | |
| 7,489,303 B1 | 2/2009 | Pryor | |
| 7,499,040 B2 | 3/2009 | Zadesky et al. | |
| 7,506,269 B2 | 3/2009 | Lang | |
| 7,519,468 B2 | 4/2009 | Orr et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,794,138 B2 | 9/2010 | Hilfiker | |
| 7,844,914 B2 | 11/2010 | Andre et al. | |
| 7,844,915 B2 | 11/2010 | Platzer et al. | |
| 7,856,255 B2 | 12/2010 | Tsuchiya et al. | |
| 7,957,762 B2 | 6/2011 | Herz et al. | |
| 8,001,488 B1 | 8/2011 | Lam | |
| 8,006,002 B2 | 8/2011 | Kalayjian et al. | |
| 8,009,144 B2 | 8/2011 | Yajima | |
| 8,050,997 B1 | 11/2011 | Nosek et al. | |
| 8,140,996 B2 | 3/2012 | Tomkins | |
| 8,239,784 B2 | 8/2012 | Hotelling et al. | |
| 8,279,180 B2 | 10/2012 | Hotelling et al. | |
| 8,307,306 B2 | 11/2012 | Komatsu | |
| 8,311,727 B2 | 11/2012 | Eckstein et al. | |
| 8,365,090 B2 | 1/2013 | Ording | |
| 8,381,135 B2 | 2/2013 | Hotelling et al. | |
| 8,479,122 B2 | 7/2013 | Hotelling et al. | |
| 8,566,722 B2 * | 10/2013 | Gordon | H04N 21/2665 715/721 |
| 8,627,236 B2 * | 1/2014 | Jung | G06F 3/04845 715/702 |
| 8,686,944 B1 | 4/2014 | Charlton et al. | |
| 8,799,816 B2 | 8/2014 | Wells et al. | |
| 8,824,245 B2 | 9/2014 | Lau et al. | |
| 9,007,057 B2 | 4/2015 | Villaret | |
| 9,007,302 B1 * | 4/2015 | Bandt-Horn | G06F 3/0202 345/156 |
| 9,007,323 B2 | 4/2015 | Araki | |
| 9,052,814 B2 | 6/2015 | Ording | |
| 9,104,705 B2 | 8/2015 | Fujinaga | |
| 9,395,867 B2 | 7/2016 | Griffin et al. | |
| 9,395,905 B2 | 7/2016 | Wherry | |

(56) References Cited

U.S. PATENT DOCUMENTS

| | | |
|---|---|---|
| 9,442,649 B2 | 9/2016 | Davis et al. |
| 9,823,828 B2* | 11/2017 | Zambetti ............... G06F 3/0362 |
| 2001/0004337 A1 | 6/2001 | Paratte |
| 2001/0011991 A1 | 8/2001 | Wang et al. |
| 2002/0015024 A1 | 2/2002 | Westerman et al. |
| 2002/0019296 A1 | 2/2002 | Freeman et al. |
| 2002/0027547 A1 | 3/2002 | Kamijo et al. |
| 2002/0030668 A1 | 3/2002 | Hoshino et al. |
| 2002/0036623 A1 | 3/2002 | Kano |
| 2002/0063684 A1* | 5/2002 | Tran ...................... G06F 3/0362 345/156 |
| 2002/0101458 A1 | 8/2002 | SanGiovanni |
| 2002/0118169 A1 | 8/2002 | Hinckley et al. |
| 2002/0126099 A1 | 9/2002 | Engholm |
| 2002/0154150 A1 | 10/2002 | Ogaki et al. |
| 2002/0154175 A1 | 10/2002 | Abello et al. |
| 2002/0171689 A1 | 11/2002 | Fox et al. |
| 2002/0186621 A1 | 12/2002 | Lai |
| 2003/0025673 A1 | 2/2003 | Ledbetter et al. |
| 2003/0076301 A1 | 4/2003 | Tsuk et al. |
| 2003/0103044 A1* | 6/2003 | Sunda ...................... G06F 3/016 345/184 |
| 2003/0112279 A1 | 6/2003 | Irimajiri |
| 2003/0115384 A1 | 6/2003 | Sonehara et al. |
| 2003/0123329 A1 | 7/2003 | Guanter et al. |
| 2003/0189598 A1 | 10/2003 | Lipstein et al. |
| 2003/0210286 A1 | 11/2003 | Gerpheide et al. |
| 2004/0013042 A1 | 1/2004 | Farine |
| 2004/0047244 A1 | 3/2004 | Iino et al. |
| 2004/0085328 A1* | 5/2004 | Maruyama ............. G06F 3/0481 345/619 |
| 2004/0100479 A1 | 5/2004 | Nakano et al. |
| 2004/0113819 A1 | 6/2004 | Gauthey et al. |
| 2004/0130580 A1 | 7/2004 | Howard et al. |
| 2004/0145595 A1 | 7/2004 | Bennett |
| 2004/0150621 A1 | 8/2004 | Bohn |
| 2004/0155907 A1 | 8/2004 | Yamaguchi et al. |
| 2004/0218472 A1 | 11/2004 | Narayanaswami et al. |
| 2004/0225613 A1 | 11/2004 | Narayanaswami et al. |
| 2004/0239692 A1* | 12/2004 | Balle ...................... G06F 3/0213 345/660 |
| 2005/0007884 A1 | 1/2005 | Lorenzato |
| 2005/0081164 A1 | 4/2005 | Hama et al. |
| 2005/0097466 A1 | 5/2005 | Levi Montalcini |
| 2005/0168566 A1 | 8/2005 | Tada et al. |
| 2005/0183012 A1* | 8/2005 | Petro ...................... G06F 3/0482 715/713 |
| 2005/0190059 A1 | 9/2005 | Wehrenberg |
| 2005/0195216 A1 | 9/2005 | Kramer et al. |
| 2005/0209051 A1 | 9/2005 | Santomassimo et al. |
| 2005/0215848 A1 | 9/2005 | Lorenzato et al. |
| 2005/0259077 A1 | 11/2005 | Adams et al. |
| 2006/0007129 A1 | 1/2006 | Pletikosa et al. |
| 2006/0017692 A1 | 1/2006 | Wehrenberg et al. |
| 2006/0020904 A1 | 1/2006 | Aaltonen et al. |
| 2006/0026535 A1 | 2/2006 | Hotelling et al. |
| 2006/0026536 A1 | 2/2006 | Hotelling et al. |
| 2006/0028444 A1 | 2/2006 | Hinckley et al. |
| 2006/0033724 A1 | 2/2006 | Chaudhri et al. |
| 2006/0092177 A1* | 5/2006 | Blasko .................... G04G 21/08 345/619 |
| 2006/0112350 A1 | 5/2006 | Kato |
| 2006/0152480 A1 | 7/2006 | Senn |
| 2006/0181506 A1 | 8/2006 | Fyke |
| 2006/0197753 A1 | 9/2006 | Hotelling |
| 2006/0255683 A1* | 11/2006 | Suzuki ...................... G05G 1/10 310/317 |
| 2006/0268019 A1 | 11/2006 | Wang et al. |
| 2006/0268020 A1 | 11/2006 | Han |
| 2007/0063995 A1 | 3/2007 | Bailey et al. |
| 2007/0070090 A1 | 3/2007 | Debettencourt et al. |
| 2007/0085841 A1 | 4/2007 | Tsuk et al. |
| 2007/0097151 A1 | 5/2007 | Rosenberg |
| 2007/0120819 A1 | 5/2007 | Young et al. |
| 2007/0209017 A1 | 9/2007 | Gupta et al. |
| 2007/0211042 A1* | 9/2007 | Kim ........................ G04C 3/005 345/184 |
| 2007/0226646 A1 | 9/2007 | Nagiyama et al. |
| 2007/0229458 A1 | 10/2007 | Moon |
| 2007/0236475 A1 | 10/2007 | Wherry |
| 2007/0242569 A1 | 10/2007 | Inoue et al. |
| 2007/0247435 A1 | 10/2007 | Benko et al. |
| 2007/0279401 A1* | 12/2007 | Ramstein ................ G06F 3/016 345/184 |
| 2007/0290045 A1 | 12/2007 | Cisar |
| 2007/0296711 A1* | 12/2007 | Yee ........................ G06F 3/0354 345/184 |
| 2008/0001915 A1 | 1/2008 | Pihlaja et al. |
| 2008/0004084 A1 | 1/2008 | Park |
| 2008/0020810 A1* | 1/2008 | Park ........................ G06F 3/0362 455/575.1 |
| 2008/0043028 A1* | 2/2008 | Tanaka ................... G06F 3/0362 345/501 |
| 2008/0123473 A1 | 5/2008 | Ozawa et al. |
| 2008/0148177 A1 | 6/2008 | Lang et al. |
| 2008/0155461 A1 | 6/2008 | Ozaki |
| 2008/0155475 A1 | 6/2008 | Duhig |
| 2008/0158149 A1* | 7/2008 | Levin ...................... G06F 3/016 345/156 |
| 2008/0165140 A1 | 7/2008 | Christie et al. |
| 2008/0168382 A1 | 7/2008 | Louch et al. |
| 2008/0168404 A1 | 7/2008 | Ording |
| 2008/0204478 A1 | 8/2008 | Hung |
| 2008/0257701 A1 | 10/2008 | Wlotzka |
| 2008/0288880 A1 | 11/2008 | Reponen et al. |
| 2008/0320391 A1 | 12/2008 | Lemay et al. |
| 2009/0015550 A1 | 1/2009 | Koski |
| 2009/0050465 A1 | 2/2009 | Asada et al. |
| 2009/0051649 A1 | 2/2009 | Rondel |
| 2009/0059730 A1 | 3/2009 | Lyons et al. |
| 2009/0079698 A1 | 3/2009 | Takashima et al. |
| 2009/0100373 A1* | 4/2009 | Pixley .................... G06F 3/03543 715/786 |
| 2009/0109069 A1 | 4/2009 | Takasaki et al. |
| 2009/0143117 A1 | 6/2009 | Shin et al. |
| 2009/0152452 A1 | 6/2009 | Lee et al. |
| 2009/0156255 A1 | 6/2009 | Shin et al. |
| 2009/0196124 A1 | 8/2009 | Mooring et al. |
| 2009/0199130 A1 | 8/2009 | Tsern et al. |
| 2009/0204920 A1* | 8/2009 | Beverley ................ G06T 3/4038 715/768 |
| 2009/0325563 A1 | 12/2009 | Horodezky et al. |
| 2010/0029327 A1 | 2/2010 | Jee |
| 2010/0058223 A1* | 3/2010 | Price ...................... G06F 3/0362 715/784 |
| 2010/0058240 A1 | 3/2010 | Buil et al. |
| 2010/0093400 A1 | 4/2010 | Ju et al. |
| 2010/0110044 A1* | 5/2010 | Englund ................ G06F 1/1626 345/184 |
| 2010/0128570 A1 | 5/2010 | Smith et al. |
| 2010/0169097 A1 | 7/2010 | Nachman et al. |
| 2010/0187074 A1 | 7/2010 | Manni |
| 2010/0220562 A1 | 9/2010 | Hozumi et al. |
| 2010/0248778 A1 | 9/2010 | Biswas |
| 2010/0259481 A1 | 10/2010 | Oh et al. |
| 2010/0269038 A1 | 10/2010 | Tsuda |
| 2010/0271340 A1 | 10/2010 | Nagashima et al. |
| 2010/0271342 A1 | 10/2010 | Nagashima et al. |
| 2010/0271343 A1 | 10/2010 | Nagashima et al. |
| 2010/0277126 A1 | 11/2010 | Naeimi et al. |
| 2010/0315417 A1 | 12/2010 | Cho et al. |
| 2010/0325575 A1 | 12/2010 | Platzer et al. |
| 2010/0331145 A1 | 12/2010 | Lakovic et al. |
| 2011/0006980 A1 | 1/2011 | Taniguchi et al. |
| 2011/0014956 A1* | 1/2011 | Lee ........................ H04M 1/274525 455/569.1 |
| 2011/0025311 A1 | 2/2011 | Chauvin et al. |
| 2011/0057886 A1 | 3/2011 | Ng et al. |
| 2011/0099509 A1 | 4/2011 | Horagai |
| 2011/0131494 A1 | 6/2011 | Ono et al. |
| 2011/0131531 A1 | 6/2011 | Russell et al. |
| 2011/0157046 A1 | 6/2011 | Lee et al. |

(56) References Cited

U.S. PATENT DOCUMENTS

| | | | |
|---|---|---|---|
| 2011/0164042 A1 | 7/2011 | Chaudhri | |
| 2011/0167262 A1 | 7/2011 | Ross et al. | |
| 2011/0187355 A1 | 8/2011 | Dixon et al. | |
| 2011/0224967 A1 | 9/2011 | Van | |
| 2011/0252357 A1 | 10/2011 | Chaudhri | |
| 2011/0296312 A1 | 12/2011 | Boyer et al. | |
| 2011/0298830 A1 | 12/2011 | Lam | |
| 2012/0026198 A1 | 2/2012 | Maesaka | |
| 2012/0044267 A1 | 2/2012 | Fino et al. | |
| 2012/0066638 A1 | 3/2012 | Ohri et al. | |
| 2012/0092383 A1* | 4/2012 | Hysek | G04G 9/00 345/684 |
| 2012/0099406 A1 | 4/2012 | Lau et al. | |
| 2012/0105484 A1 | 5/2012 | Cui | |
| 2012/0131504 A1 | 5/2012 | Fadell et al. | |
| 2012/0174005 A1 | 7/2012 | Deutsch et al. | |
| 2012/0186951 A1 | 7/2012 | Wu et al. | |
| 2012/0278725 A1* | 11/2012 | Gordon | H04N 21/2665 715/738 |
| 2012/0324390 A1 | 12/2012 | Tao et al. | |
| 2013/0142016 A1* | 6/2013 | Pozzo Di Borgo | G04C 3/002 368/82 |
| 2013/0145292 A1 | 6/2013 | Cohen et al. | |
| 2013/0169579 A1 | 7/2013 | Havnor | |
| 2013/0176020 A1 | 7/2013 | Chauvin et al. | |
| 2013/0205939 A1 | 8/2013 | Meerovitsch | |
| 2013/0218517 A1 | 8/2013 | Ausserlechner | |
| 2013/0258819 A1* | 10/2013 | Hoover | G04C 3/146 368/184 |
| 2013/0303087 A1 | 11/2013 | Hauser et al. | |
| 2014/0028688 A1 | 1/2014 | Houjou et al. | |
| 2014/0132640 A1 | 5/2014 | Sharma et al. | |
| 2014/0137020 A1 | 5/2014 | Sharma et al. | |
| 2014/0143678 A1 | 5/2014 | Mistry et al. | |
| 2014/0253487 A1 | 9/2014 | Bezinge et al. | |
| 2014/0258935 A1 | 9/2014 | Nishida et al. | |
| 2014/0260776 A1 | 9/2014 | Burleson | |
| 2014/0282214 A1 | 9/2014 | Shirzadi et al. | |
| 2014/0306989 A1 | 10/2014 | Doubleday et al. | |
| 2014/0347289 A1 | 11/2014 | Suh et al. | |
| 2015/0277559 A1 | 10/2015 | Vescovi et al. | |
| 2015/0370529 A1 | 12/2015 | Zambetti et al. | |
| 2015/0378447 A1 | 12/2015 | Nagano et al. | |
| 2016/0034133 A1 | 2/2016 | Wilson et al. | |
| 2016/0034166 A1 | 2/2016 | Wilson et al. | |
| 2016/0034167 A1 | 2/2016 | Wilson et al. | |
| 2016/0062466 A1 | 3/2016 | Moussette et al. | |
| 2016/0063828 A1 | 3/2016 | Moussette et al. | |
| 2016/0098016 A1 | 4/2016 | Ely et al. | |
| 2016/0170598 A1* | 6/2016 | Zambetti | G06F 3/0485 715/784 |
| 2016/0170624 A1 | 6/2016 | Zambetti et al. | |
| 2016/0170625 A1 | 6/2016 | Zambetti et al. | |
| 2016/0202866 A1 | 7/2016 | Zambetti et al. | |
| 2016/0209939 A1 | 7/2016 | Zambetti et al. | |
| 2016/0259535 A1 | 9/2016 | Fleizach et al. | |
| 2016/0269540 A1 | 9/2016 | Butcher et al. | |
| 2016/0327911 A1 | 11/2016 | Eim et al. | |
| 2017/0315716 A1 | 11/2017 | Zambetti et al. | |
| 2018/0074690 A1 | 3/2018 | Zambetti et al. | |

FOREIGN PATENT DOCUMENTS

| | | |
|---|---|---|
| CN | 1757011 A | 4/2006 |
| CN | 101431545 A | 5/2009 |
| CN | 101446802 A | 6/2009 |
| CN | 101241407 B | 7/2011 |
| CN | 102402328 A | 4/2012 |
| CN | 101034328 B | 2/2013 |
| CN | 103460164 A | 12/2013 |
| EP | 1052566 A1 | 11/2000 |
| EP | 1168149 A2 | 1/2002 |
| EP | 1850213 A2 | 10/2007 |
| EP | 2207084 A2 | 7/2010 |
| EP | 2302492 A2 | 3/2011 |
| EP | 2385451 A1 | 11/2011 |
| JP | 2000-305760 A | 11/2000 |
| JP | 2001-202178 A | 7/2001 |
| JP | 2002-288690 A | 10/2002 |
| JP | 20003-248544 A | 9/2003 |
| JP | 2003-330585 A | 11/2003 |
| JP | 2003-330856 A | 11/2003 |
| JP | 2004-184396 A | 7/2004 |
| JP | 2004-259063 A | 9/2004 |
| JP | 2006-11690 A | 1/2006 |
| JP | 2008-157974 A | 7/2008 |
| JP | 2008-539513 A | 11/2008 |
| JP | 2009-59382 A | 3/2009 |
| JP | 2009-510404 A | 3/2009 |
| JP | 2009-128296 A | 6/2009 |
| JP | 2009-294526 A | 12/2009 |
| JP | 2011-8540 A | 1/2011 |
| JP | 2011-90640 A | 5/2011 |
| JP | 2011-96043 A | 5/2011 |
| JP | 2011-530738 A | 12/2011 |
| JP | 2013-114844 A | 6/2013 |
| JP | 2013-122738 A | 6/2013 |
| JP | 2014-42164 A | 3/2014 |
| KR | 10-0630154 B1 | 9/2006 |
| KR | 10-2011-0093090 A | 8/2011 |
| KR | 10-2011-0114294 A | 10/2011 |
| KR | 10-2012-0079707 A | 7/2012 |
| KR | 10-2013-0027017 A | 3/2013 |
| TW | D122820 S | 5/2008 |
| WO | 1996/19872 A1 | 6/1996 |
| WO | 0169369 A1 | 9/2001 |
| WO | 2006/037545 A2 | 4/2006 |
| WO | 2009/026508 A1 | 2/2009 |
| WO | 2010/024969 A1 | 3/2010 |
| WO | 2010/150768 A1 | 12/2010 |
| WO | 2012080020 A1 | 6/2012 |
| WO | 2013/114844 A1 | 8/2013 |
| WO | 2013/169849 A2 | 11/2013 |
| WO | 2014105276 A1 | 7/2014 |

OTHER PUBLICATIONS

Office Action received for Taiwan Patent Application No. 103130519. 0, dated Mar. 25, 2016, 14 pages( 6 pages of English Translation and 8 pages of Official Copy).

International Preliminary Report on Patentability received for PCT Patent Application No. PCT/US2014/053951, dated Mar. 17, 2016, 9 pages.

International Search Report and Written Opinion received for PCT Patent Application No. PCT/US2014/053951, dated Dec. 8, 2014, 11 pages.

International Search Report and Written Opinion received for PCT Patent Application No. PCT/US2014/053958, dated Feb. 19, 2015, 10 pages.

International Preliminary Report on Patentability received for PCT Patent Application No. PCT/US2014/053958, dated Mar. 17, 2016, 8 pages.

Invitation to Pay Additional Fees received for PCT Application No. PCT/US2014/053961, dated Aug. 3, 2015, 6 pages.

Kamijo, Noboru, "Next Generation Mobile System—WatchPad1. 5", Available at <http://researcher.ibm.com/researcher/view_group_subpage.php?id=5617>, retrieved on Jul. 4, 2015, 2 pages.

NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.

Invitation to Pay Additional Fees received for PCT Patent Application No. PCT/US2016/019637, dated Jun. 1, 2016, 6 pages.

Notice of Allowance received for Taiwanese Patent Application No. 103130518, dated May 19, 2016, 2 pages. (See Communication under 37 CFR § 1.98(a) (3)).

Office Action and Search Report received for Danish Patent Application No. PA 201670118, dated Jul. 1, 2016, 7 pages.

Office Action received for Taiwanese Patent Application No. 103130520, dated May 23, 2016, 38 pages (15 pages of English Translation and 23 pages of Official Copy).

(56) References Cited

OTHER PUBLICATIONS

International Preliminary Report on Patentability received for PCT Patent Application No. PCT/US2014/053961, dated Jul. 21, 2016, 24 pages.
Written Opinion received for PCT Patent Application No. PCT/US2014/053961, dated Jul. 11, 2016, 22 pages.
International Search Report and Written Opinion received for PCT Patent Application No. PCT/US2016/019637, dated Aug. 18, 2016, 18 pages.
International Search Report received for PCT Patent Application No. PCT/US2014/053961, dated Jul. 11, 2016, 10 pages.
Advisory Action received for U.S. Appl. No. 15/049,064, dated May 10, 2017, 3 Pages.
Final Office Action received for U.S. Appl. No. 15/049,058, dated May 8 2017, 21 pages.
Notice of Allowance received for Australian Patent Application No. 2014315325, dated Apr. 19, 2017, 3 Pages.
Office Action received for Japanese Patent Application No. 2016-537945, dated Apr. 7, 2017, 6 pages (3 pages of English Translation and 3 pages of Official Copy).
Office Action received for Taiwanese Patent Application No. 103130520, dated Apr. 17, 2017, 8 pages (3 pages of English Translation and 5 pages of Official Copy).
"The Interview With a Key Person. IBM and Citizen met and Applied Linux to a Watch", ASCII Corporation, vol. 25, No. 12, Consecutive vol. 294, Dec. 1, 2001, pp. 137-143.
Final Office Action received for U.S. Appl. No. 15/049,049, dated May 23, 2017, 23 pages.
Wikipedia, "Rotary encoder", <https://zh.wikipedia.org/wiki/%E6%97%8B%E8%BD%89%E7%B7%A8%E7%A2%BC%E5%99%A8>, Retrieved on May 17, 2017, 17 pages (10 pages of English Translation and 7 pages of Official Copy).
Notice of Allowance received for U.S. Appl. No. 15/049,064, dated Jul. 18, 2017, 24 pages.
Office Action received for Australian Patent Application No. 2014315234, dated Jul. 12, 2017, 4 pages.
Office Action received for European Patent Application No. 14772002.3, dated Jul. 4, 2017, 8 pages.
Office Action received for Japanese Patent Application No. 2016-537948, dated Jun. 9, 2017, 10 pages (5 pages of English Translation and 5 pages of Official Copy).
Office Action received for Chinese Patent Application No. 201480060082.7, dated Jan. 26, 2018, 15 pages (4 pages of English translation and 11 pages of Official Copy).
Non-Final Office Action received for U.S. Appl. No. 14/913,345, dated Apr. 5, 2018, 15 pages.
Brinkmann, Martin, "How to Zoom in Firefox", Ghacks, Available at <https://web.archive.org/web/20130804034728/https://www.ghacks.net/2009/02/23/how-to-zoom-in-firefox/>, Feb. 23, 2009, 11 pages.
Non-Final Office Action received for U.S. Appl. No. 15/049,049 dated Dec. 15, 2017, 23 pages.
Office Action received for European Patent Application No. 14771688.0, dated Nov. 30, 2017, 15 pages.
Office Action received for Korean Patent Application No. 10-2016-7008488, dated Nov. 27, 2017, 6 pages (3 page of English Translation and 3 pages of Official Copy).
Office Action received for Korean Patent Application No. 10-2016-7008474, dated Nov. 27, 2017, 6 pages (2 page of English Translation and 4 pages of Official Copy).
Office Action received for Korean Patent Application No. 10-2016-7008682, dated Nov. 27, 2017, 7 pages (3 page of English Translation and 4 pages of Official Copy).
Non-Final Office Action received for U.S. Appl. No. 15/049,058, dated Feb. 20, 2018, 21 pages.
Notice of Allowance Action received for U.S. Appl. No. 14/841,656, dated Feb. 12, 2018, 9 pages.
Office Action received for Japanese Patent Application No. 2016-537945, dated Jan. 9, 2018, 5 pages (2 page of English Translation and 3 pages of Official copy).

Office Action received for Korean Patent Application No. 10-2016-7008682, dated Feb. 8, 2018, 7 pages (3 pages of English Translation and 4 pages of Official Copy).
Decision to Grant received for Danish Patent Application No. PA201770181, dated Mar. 7, 2018, 2 pages.
Notice of Allowance received for U.S. Appl. No. 14/841,656, dated Mar. 5, 2018, 3 pages.
Office Action received for Australian Patent Application No. 2018200998, dated Mar. 9, 2018, 5 pages.
Office Action received for Korean Patent Application No. 10-2016-7008488, dated Feb. 8, 2018, 8 pages (4 page of English Translation and 4 pages of Official Copy).
Office Action received for Korean Patent Application No. 10-2018-7002695, dated Feb. 27, 2018, 12 pages (5 pages of English Translation and 7 pages of Official Copy).
Office Action received for Taiwanese Patent Application No. 103130520, dated Jan. 23, 2018, 05 pages (2 pages of English Translation and 3 pages of Offcial Copy).
IBM, "watchpad 1.5", Online Available at <web.archive.org/web/20011205071448/http://www.trl.ibm.com/projects/ngm/index_e.htm>, 2 pages.
Raghunath et al., "User Interfaces for Applications on a Wrist Watch", Journal of Personal and Ubiquitous Computing, vol. 6, No. 1, pp. 17-30.
"Watchpad 1.5 demo", YouTube.com, Online Available at <https://www.youtube.com/watch?v=7xjvVbeUn80>, Uploaded on Jun. 20, 2010, 2 pages.
Non-Final Office Action received for U.S. Appl. No. 15/049,058, dated Nov. 16, 2016, 19 pages.
Non-Final Office Action received for U.S. Appl. No. 15/049,064, dated Oct. 27, 2016, 15 pages.
Non-Final Office Action received for U.S. Appl. 15/049,049, dated Nov. 9, 2016, 13 pages.
Notice of Allowance received for Taiwanese Patent Application No. 103130519, dated Oct. 27, 2016, 3 pages (Official Copy only) (see attached 37 CFR § 1.98(a) (3)).
Office Action received for Australian Patent Application No. 2014315234, dated Nov. 2, 2016, 3 pages.
Office Action received for Australian Patent Application No. 2014315319, dated Oct. 17, 2016, 3 pages.
Office Action received for Australian Patent Application No. 2014315325, dated Nov. 3, 2016, 3 pages.
Office Action received for Taiwanese Patent Application No. 103130520, dated Sep. 29, 2016, 39 pages (16 pages of English Translation and 23 pages of Official Copy).
Final Office Action received for U.S. Appl. No. 15/049,064, dated Feb. 27, 2017, 13 pages.
Office Action received for Danish Patent Application No. PA201670113, dated Oct. 25, 2016, 3 pages.
Notice of Allowance received for Danish Patent Application No. PA201670118, dated Mar. 30, 2017, 2 pages.
Office Action received for Japanese Patent Application No. 2016-537947, dated Feb. 24, 2017, 6 pages (3 pages of English Tramsiation and 3 pages of Official Copy).
Office Action received for Australian Patent Application No. 2014315234, dated Apr. 19, 2017, 4 pages.
Notice of Allowance received for Japanese Patent Application No. 2016-537947, dated Jun. 5, 2017, 3 pages (Official Copy only) (see attached 37 CFR § 1.98(a) (3)).
Office Action received for Danish Patent Application No. PA201770181, dated Jun. 13, 2017, 6 pages.
Office Action received for European Patent Application No. 14772494.2, dated Jun. 20, 2017, 7 pages.
Advisory Action received for U.S. Appl. No. 15/049,058, dated Oct. 18, 2017, 3 pages.
International Preliminary Report on Patentability received for PCT Patent Application No. PCT/US2016/019637, dated Sep. 21, 2017, 12 pages.
Notice of Allowance received for Australian Patent Application No. 2014315319, dated Oct. 12, 2017, 3 pages.
Office Action received for Danish Patent Application No. PA201770181, dated Jan. 3, 2018, 2 pages.

(56) References Cited

OTHER PUBLICATIONS

Office Action received for Korean Patent Application No. 10-2016-7008474, dated Dec. 28, 2016, 10 pages (4 pages of Eglish Translation and 6 pages of Official Copy).
Office Action received for Korean Patent Application No. 10-2016-7008488, dated Jan. 12, 2017, 14 pages (6 pages of English Translation 8 pages of Official Copy).
Office Action received for Karean Patent Application No. 10-2016-7008682, dated Dec. 30, 2016, 11 pages (4 pages of English Translation 7 pages of Official Copy).
Office Action received for Danish Patent Application No. PA201670118, dated Feb. 2, 2017, 2 pages.
Non-Final Office Action received for U.S. Appl. No. 14/841,656, dated Jul. 26, 2017, 20 pages.
Office Action received for Australian Patent Application No. 2014 15319, dated Aug. 3, 2017, 3 pages.
Final Office Action received for U.S. Appl. No. 15/049,058, dated Aug. 8, 2018, 23 pages.
Notice of Allowance received for Japanese Patent Application No. 2016-537945, dated Aug. 3, 2018, 4 pages (1 page of English translation and 3 pages of Official copy).
Office Action received for Korean Patent Application No. 10-2016-7008474, dated Aug. 6, 2018, 10 pages (5 pages of English Translation and 5 pages of Official Copy).
Corrected Notice of Allowance received for U.S. Appl. No. 14/841,656, dated Apr. 11, 2018, 2 pages.
Office Action received for Chinese Patent Application No. 201480059543.9, dated Jan. 26, 2018, 17 pages (4 pages of English Translation and 13 pages of Official Copy).
Office Action received for European Patent Application No. 14771688.0, dated May 31, 2018, 6 pages.
Office Action received for Korean Patent Application No. 10-2016-7008474, dated May 15, 2018, 7 pages (3 pages of English Translation and 4 pages of Official Copy).
Office Action received for Chinese Patent Application No. 201480060082.7, dated Sep. 25, 2018, 6 pages (3 pages of English Translation and 3 pages of Official copy).
Office Action received for European Patent Application No. 14772494.2, dated Oct. 2, 2018, 9 pages.
Office Action received for Japanese Patent Application No. 2016-537948, dated Sep. 3, 2018, 4 pages (2 pages of English Translation and 2 pages of Official copy).
Office Action received for Korean Patent Application No. 10-2017-7024506, dated Sep. 28, 2018, 11 pages (4 pages of English Translation and 7 pages of Official Copy).
Office Action received for Chinese Patent Application No. 201480059543.9, dated Sep. 19, 2018, 18 pages (5 pages of English Translation and 13 pages of Official Copy).
Final Office Action received for U.S. Appl. No. 15/049,049 dated Jul. 12, 2018, 24 pages.
Office Action received for Korean Patent Application No. 10-2018-7002695, dated Jun. 19, 2018, 8 pages (4 pages of English Translation and 4 pages of Official Copy).
Office Action received for Australian Patent Application No. 2016229407, dated Aug. 15, 2018, 4 pages.
Office Action received for Korean Patent Application No. 10-2018-7013265, dated Aug. 10, 2018, 12 pages (5 pages of English Translation and 7 pages of Official copy).
Office Action received for Australian Patent Application No. 2017254897, dated Aug. 29, 2018, 4 pages.
Office Action received for Japanese Patent Application No. 2017-545561, dated Aug. 6, 2018, 8 pages (4 pages of English Translation and 4 pages of Official copy).
Corrected Notice of Allowance received for U.S. Appl. No. 14/841,656, dated May 7, 2018, 14 pages.
Notice of Allowance received for Taiwanese Patent Application No. 103130520, dated Apr. 27, 2018, 4 pages (1 page of English Translation and 3 pages of Official copy).
Office Action received for European Patent Application No. 18157131.6, dated May 8, 2018, 12 pages.
Office Action received for Japanese Patent Application No. 2016-537948, dated Apr. 6, 2018, 5 pages (2 pages of English Translation and 3 pages of Official Copy).
Search Report received for European Patent Application No. 18157131.6, dated Apr. 19, 2018, 4 pages.
Final Office Action received for U.S. Appl. No. 14/913,345, dated Oct. 26, 2018, 20 pages.
Notice of Allowance received for Korean Patent Application No. 10-2018-7002695, dated Oct. 8, 2018, 5 pages (2 pages of English Translation and 3 pages of Official Copy).

* cited by examiner

USER INTERFACE OBJECT MANIPULATIONS IN A USER INTERFACE

CROSS REFERENCE TO RELATED APPLICATIONS

This application is a national stage application of International Application No. PCT/US2014/053958, filed Sep. 3, 2014, entitled "USER INTERFACE OBJECT MANIPULATIONS IN A USER INTERFACE," which claims priority to: U.S. Provisional Patent Application Ser. No. 61/873,356, filed Sep. 3, 2013, entitled "CROWN INPUT FOR A WEARABLE ELECTRONIC DEVICE"; U.S. Provisional Patent Application Ser. No. 61/873,359, filed Sep. 3, 2013, entitled "USER INTERFACE OBJECT MANIPULATIONS IN A USER INTERFACE"; U.S. Provisional Patent Application Ser. No. 61/959,851, filed Sep. 3, 2013, entitled "USER INTERFACE FOR MANIPULATING USER INTERFACE OBJECTS"; and U.S. Provisional Patent Application Ser. No. 61/873,360, filed Sep. 3, 2013, entitled "USER INTERFACE FOR MANIPULATING USER INTERFACE OBJECTS WITH MAGNETIC PROPERTIES". International Application No. PCT/US2014/053958, filed Sep. 3, 2014, entitled "USER INTERFACE OBJECT MANIPULATIONS IN A USER INTERFACE," is also a continuation-in-part of U.S. Non-provisional patent application Ser. No. 14/476,657, filed Sep. 3, 2014, entitled "USER INTERFACE FOR MANIPULATING USER INTERFACE OBJECTS WITH MAGNETIC PROPERTIES". The content of these applications is hereby incorporated by reference in its entirety for all purposes.

This application is related to International Patent Application Serial Number PCT/US2014/053961, filed Sep. 3, 2014, entitled "USER INTERFACE FOR MANIPULATING USER INTERFACE OBJECTS WITH MAGNETIC PROPERTIES"; International Patent Application Serial Number PCT/US2014/053957, filed Sep. 3, 2014, entitled "USER INTERFACE FOR MANIPULATING USER INTERFACE OBJECTS"; and International Patent Application Serial Number PCT/US2014/053951, filed Sep. 3, 2014, entitled "CROWN INPUT FOR A WEARABLE ELECTRONIC DEVICE". The content of these applications is hereby incorporated by reference in its entirety for all purposes.

FIELD

This disclosure relates generally to user interfaces and, more specifically, to user interfaces using a crown input mechanism.

BACKGROUND

Advanced personal electronic devices can have small form factors. These personal electronic devices include, but are not limited to, tablets and smart phones. Use of such personal electronic devices involves manipulation of user interface objects on display screens which also have small form factors that complement the design of the personal electronic devices.

Exemplary manipulations that users can perform on personal electronic devices include navigating a hierarchy, selecting a user interface object, adjusting the position, size, and zoom of user interface objects, or otherwise manipulating user interfaces. Exemplary user interface objects include digital images, video, text, icons, maps, control elements such as buttons, and other graphics. A user can perform such manipulations in image management software, video editing software, word pressing software, software execution platforms such as an operating system's desktop, website browsing software, and other environments.

Existing methods for manipulating user interface objects on reduced-size touch-sensitive displays can be inefficient. Further, existing methods generally provide less precision than is preferable.

SUMMARY

Systems and processes for manipulating a graphical user interface are disclosed. One process can include receiving user input through a crown to rotate a virtual object. The process includes selecting a surface of the object from among the multiple surfaces of the object in response to determining that the crown rotation exceeded a speed threshold.

BRIEF DESCRIPTION OF THE DRAWINGS

The present application can be best understood by reference to the following description taken in conjunction with the accompanying drawing figures, in which like parts may be referred to by like numerals.

DETAILED DESCRIPTION

In the following description of the disclosure and examples, reference is made to the accompanying drawings in which it is shown by way of illustration specific examples that can be practiced. It is to be understood that other examples can be practiced and structural changes can be made without departing from the scope of the disclosure.

Many personal electronic devices have graphical user interfaces with options that can be activated in response to user inputs. Typically, a user can select and activate a particular option from among multiple options. For example, a user may select an option by placing a mouse cursor over the desired option using a pointing device. The user may activate the option by clicking a button of the pointing device while the option is selected. In another example, a user may select and activate an option displayed on a touch-sensitive display (also known as a touch screen) by touching the touch-sensitive display at the location of the displayed option. Given the inefficiency of existing methods for selecting options on reduced-size touch-sensitive displays, there is a need for methods that enable users to more efficiently and conveniently select a desired option in a graphical user interface environment.

The examples below describe improved techniques for selecting a surface of a user interface object in a graphical user interface using user inputs. More specifically, these techniques use a physical crown as an input device to enable a user to select a desired option by selecting a surface of the user interface object. As a result, the examples described below allow a user to more efficiently and conveniently select a desired option.

Figure 1:
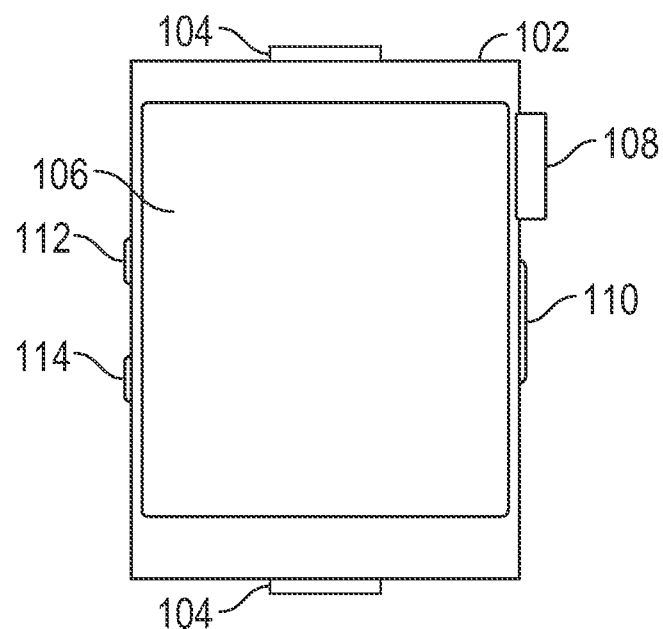
FIG. 1 illustrates an exemplary wearable electronic device according to various examples.

FIG. 1 illustrates exemplary personal electronic device 100. In the illustrated example, device 100 is a watch that generally includes body 102 and strap 104 for affixing device 100 to the body of a user. That is, device 100 is wearable. Body 102 can designed to couple with straps 104. Device 100 can have touch-sensitive display screen (hereafter touchscreen) 106 and crown 108. Device 100 can also have buttons 110, 112, and 114.

Conventionally, the term 'crown,' in the context of a watch, refers to the cap atop a stem for winding the watch. In the context of a personal electronic device, the crown can be a physical component of the electronic device, rather than a virtual crown on a touch sensitive display. Crown 108 can be mechanical meaning that it can be connected to a sensor for converting physical movement of the crown into electrical signals. Crown 108 can rotate in two directions of rotation (e.g., forward and backward). Crown 108 can also be pushed in towards the body of device 100 and/or be pulled away from device 100. Crown 108 can be touch-sensitive, for example, using capacitive touch technologies that can detect whether a user is touching the crown. Moreover, crown 108 can further be rocked in one or more directions or translated along a track along an edge or at least partially around a perimeter of body 102. In some examples, more than one crown 108 can be used. The visual appearance of crown 108 can, but need not, resemble crowns of conventional watches. Buttons 110, 112, and 114, if included, can each be a physical or a touch-sensitive button. That is, the buttons may be, for example, physical buttons or capacitive buttons. Further, body 102, which can include a bezel, may have predetermined regions on the bezel that act as buttons.

Display 106 can include a display device, such as a liquid crystal display (LCD), light-emitting diode (LED) display, organic light-emitting diode (OLED) display, or the like, positioned partially or fully behind or in front of a touch sensor panel implemented using any desired touch sensing technology, such as mutual-capacitance touch sensing, self-capacitance touch sensing, resistive touch sensing, projection scan touch sensing, or the like. Display 106 can allow a user to perform various functions by touching over hovering near the touch sensor panel using one or more fingers or other object.

In some examples, device 100 can further include one or more pressure sensors (not shown) for detecting a force or pressure applied to the display. The force or pressure applied to display 106 can be used as an input to device 100 to perform any desired operation, such as making a selection, entering or exiting a menu, causing the display of additional options/actions, or the like. In some examples, different operations can be performed based on the amount of force or pressure being applied to display 106. The one or more pressure sensors can further be used to determine a position that the force is being applied to display 106.

Figure 2:
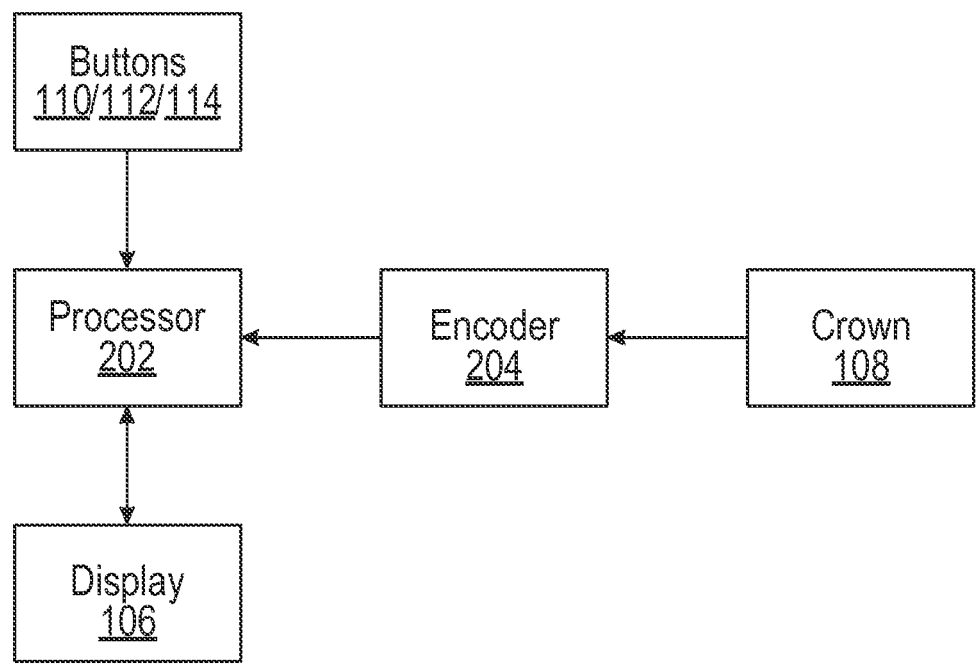
FIG. 2 illustrates a block diagram of an exemplary wearable electronic device according to various examples.

FIG. 2 illustrates a block diagram of some of the components of device 100. As shown, crown 108 can be coupled to encoder 204, which can be configured to monitor a physical state or change of state of crown 108 (e.g., the position of the crown), convert it to an electrical signal (e.g., convert it to an analog or digital signal representation of the position or change in position of crown 108), and provide the signal to processor 202. For instance, in some examples, encoder 204 can be configured to sense the absolute rotational position (e.g., an angle between 0-360°) of crown 108 and output an analog or digital representation of this position to processor 202. Alternatively, in other examples, encoder 204 can be configured to sense a change in rotational position (e.g., a change in rotational angle) of crown 108 over some sampling period and to output an analog or digital representation of the sensed change to processor 202. In these examples, the crown position information can further indicate a direction of rotation of the crown (e.g., a positive value can correspond to one direction and a negative value can correspond to the other). In yet other examples, encoder 204 can be configured to detect a rotation of crown 108 in any desired manner (e.g., velocity, acceleration, or the like) and can provide the crown rotational information to processor 202. In alternative examples, instead of providing information to processor 202, this information can be provided to other components of device 100. While the examples described herein refer to the use of rotational position of crown 108 to control scrolling, scaling, or an objects position, it should be appreciated that any other physical state of crown 108 can be used.

In some examples, the physical state of the crown can control physical attributes of display 106. For example, if crown 108 is in a particular position (e.g., rotated forward), display 106 can have limited z-axis traversal ability. In other words, the physical state of the crown can represent physical modal functionality of display 106. In some examples, a temporal attribute of the physical state of crown 108 can be used as an input to device 100. For example, a fast change in physical state can be interpreted differently than a slow change in physical state.

Processor 202 can be further coupled to receive input signals from buttons 110, 112, and 114, along with touch signals from touch-sensitive display 106. The buttons may be, for example, physical buttons or capacitive buttons. Further, body 102, which can include a bezel, may have predetermined regions on the bezel that act as buttons. Processor 202 can be configured to interpret these input signals and output appropriate display signals to cause an image to be produced by touch-sensitive display 106. While a single processor 202 is shown, it should be appreciated that any number of processors or other computational devices can be used to perform the general functions discussed above.

FIGS. 3-12 illustrate an exemplary user interface 300 displaying a two-sided user interface object 302. Object 302 has a first surface 304 and a second surface 306. Each surface of object 302 is a selectable surface associated with corresponding data. The data may be, for example, text, an image, an application icon, an instruction, a binary ON or OFF option, and the like. A user can select a surface from among the multiple selectable surfaces of object 302 by using a physical crown of a wearable electronic device to rotate object 302 to align the desired selection surface such that the surface is parallel to the display 106 of the device 100 and is displayed on the display 106. The system is designed to transition between one surface to another, rather than stopping in between surfaces. Although examples are described with respect to object surfaces (or planes) being parallel to display 106, the examples can also be modified to instead be described with respect to object surfaces (or planes) facing the viewer of display 106. This modification may be particularly helpful when object surfaces or display 106 is not plane surface.

Crown 108 of device 100 is a user rotatable user interface input. The crown 108 can be turned in two distinct directions: clockwise and counterclockwise. FIGS. 3-12 include rotation direction arrows illustrating the direction of crown rotation and movement direction arrows illustrating the direction of rotation of a user interface object, where applicable. The rotation direction arrows and movement direction arrows are typically not part of the displayed user interface, but are provided to aid in the interpretation of the figures. In this example, a clockwise direction rotation of crown 108 is illustrated by a rotation direction arrow pointing in the up direction. Similarly, a counterclockwise direction rotation of crown 108 is illustrated by a rotation direction arrow pointing in the down direction. The characteristics of the rotation direction arrow are not indicative of the distance, speed, or acceleration with which crown 108 is rotated by a user. Instead, the rotation direction arrow is indicative of the direction of rotation of crown 108 by the user.

Figure 3:
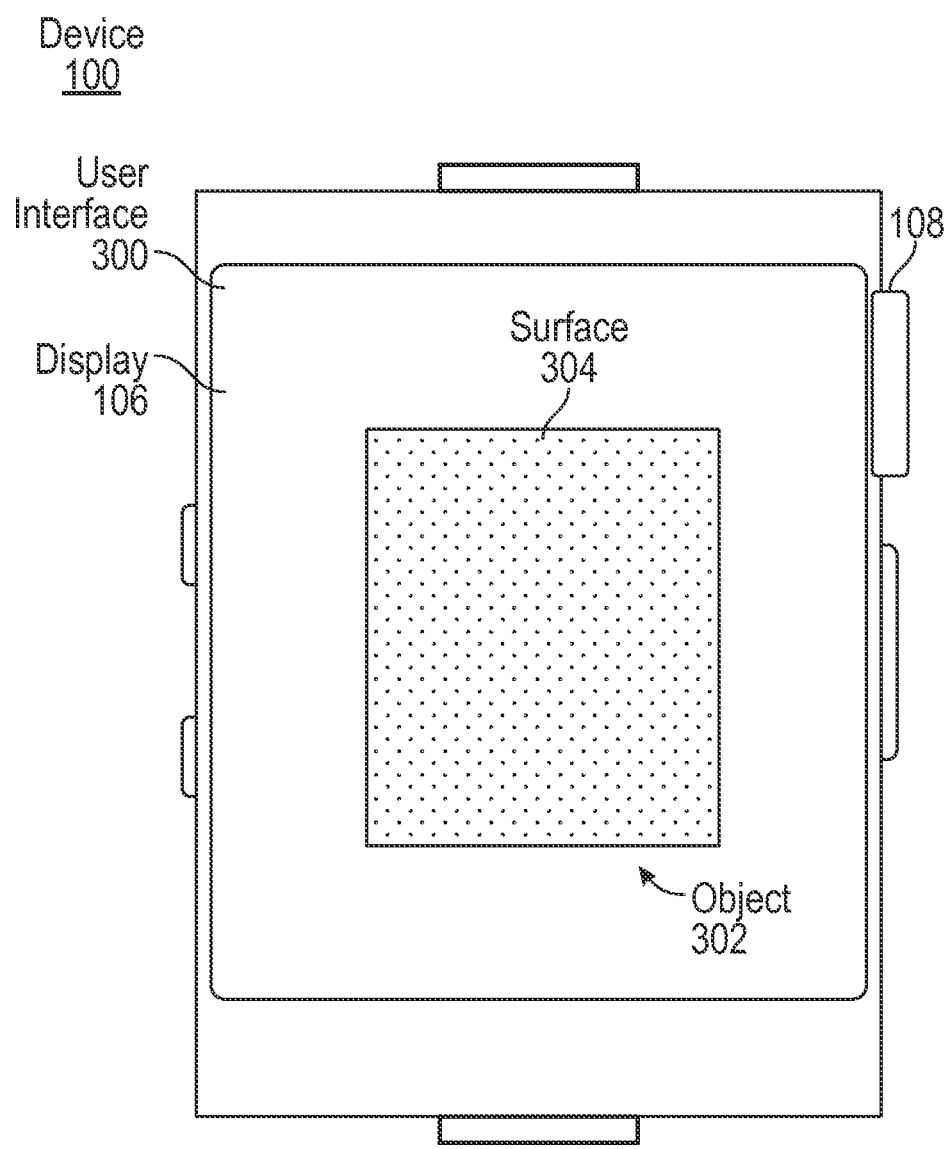
FIGS. 3-12 illustrate an exemplary graphical user interface showing the selection of a surface of a two-sided object in response to a rotation of a crown.
Figure 4:
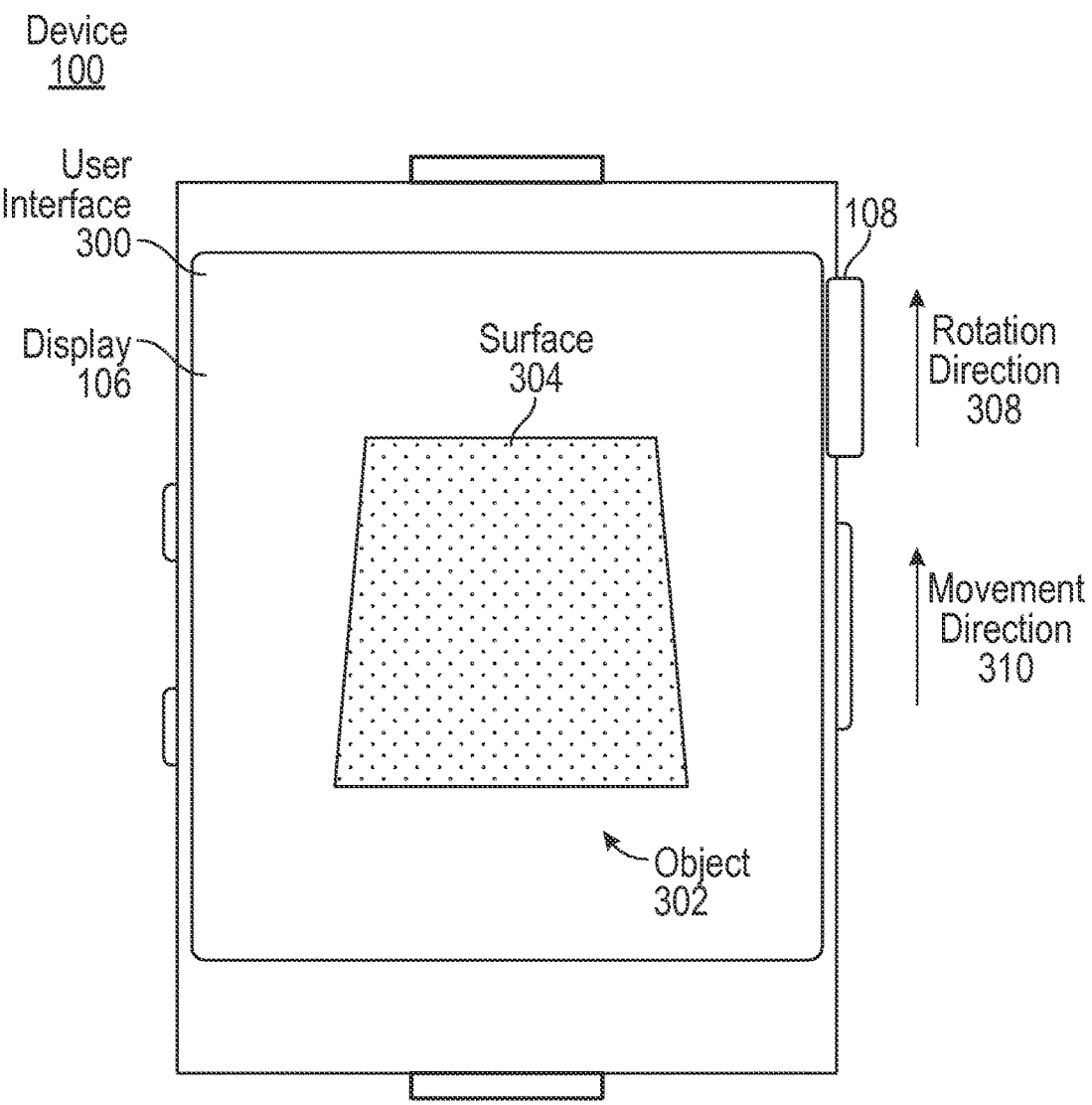

At FIG. 3, first surface 304 of object 302 is aligned parallel to display 106 and is displayed, indicating selection of first surface 304. The selected first surface 304 can be activated through, for example, an additional user input. At FIG. 4, device 100 determines a change in the position of crown 108 in the clockwise direction, as indicated by rotation direction arrow 308. Device 100 determines a rotational speed and a direction based on the determined change in the position of crown 108. In response to determining the change in the position of crown 108, the device rotates object 302, as indicated by movement direction arrow 310 and illustrated in FIG. 4. The rotation of object 302 is based on the determined rotational speed and direction. Rotational speed may be expressed in numerous ways. For example, rotational speed may be expressed as hertz, as rotations per unit of time, as rotations per frame, as revolutions per unit of time, as revolutions per frame, as a change in angle per unit of time, and the like. In one example, object 302 may be associated with a mass or may have a calculated rotational inertia.

Figure 5:
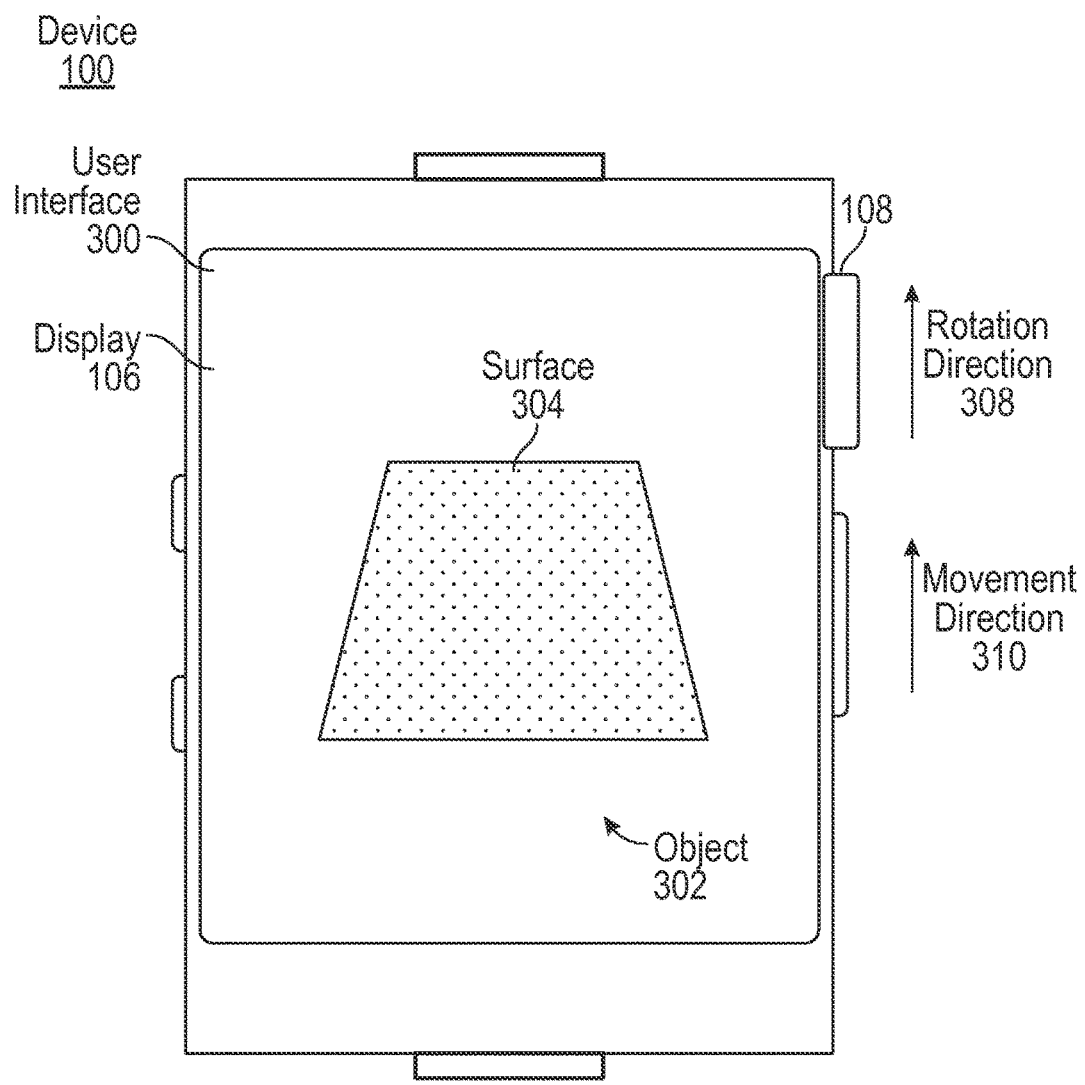
Figure 6:
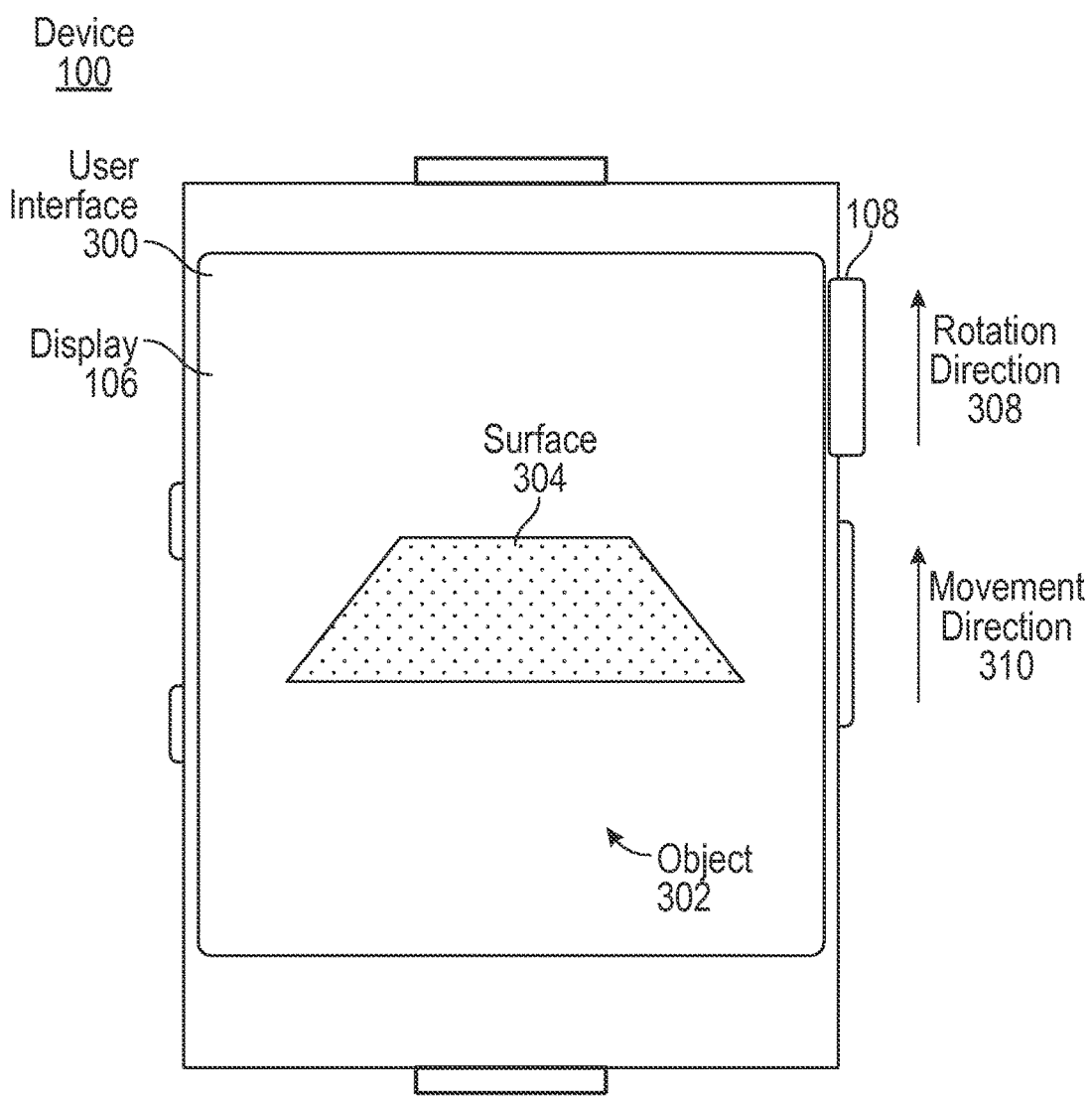
Figure 7:
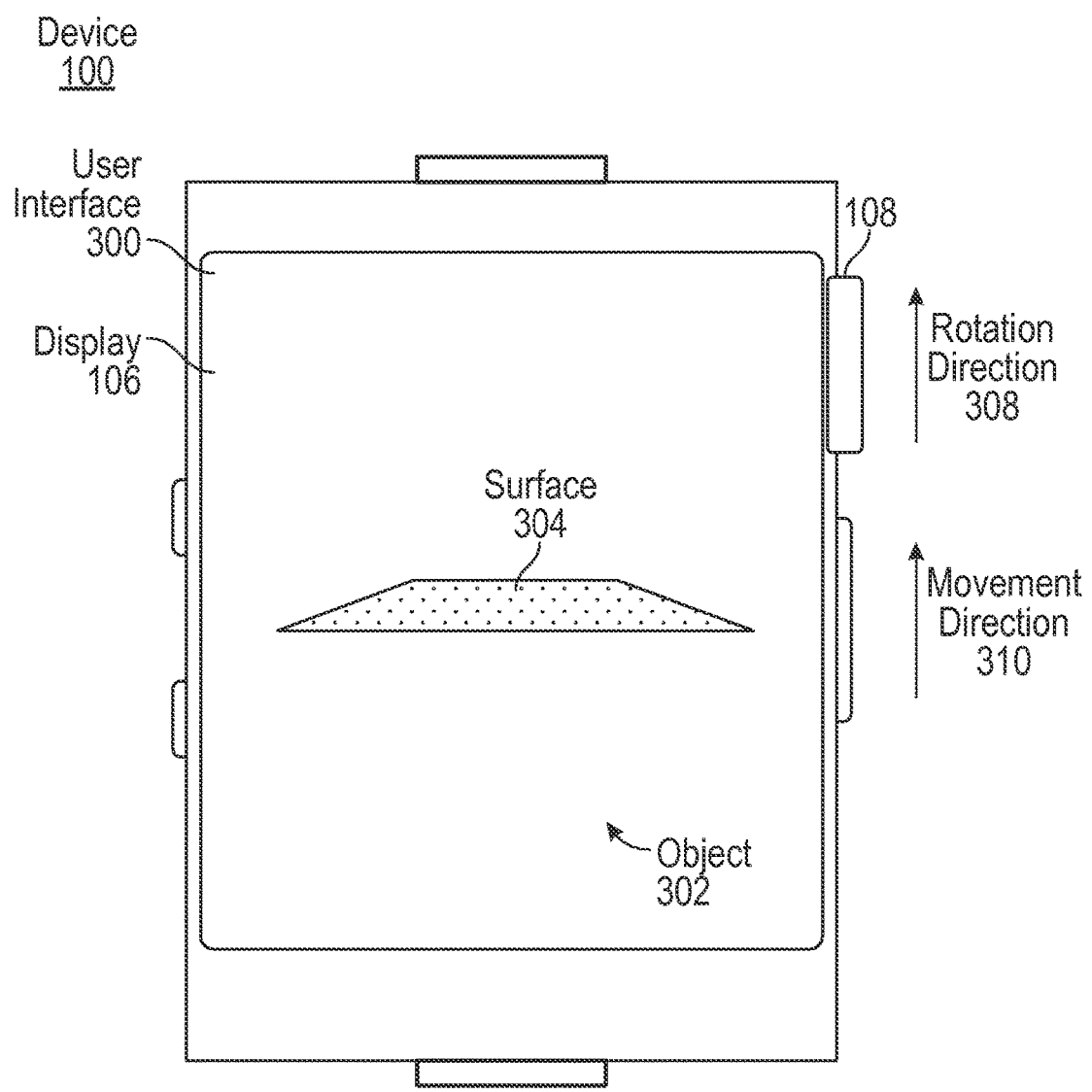
Figure 8:
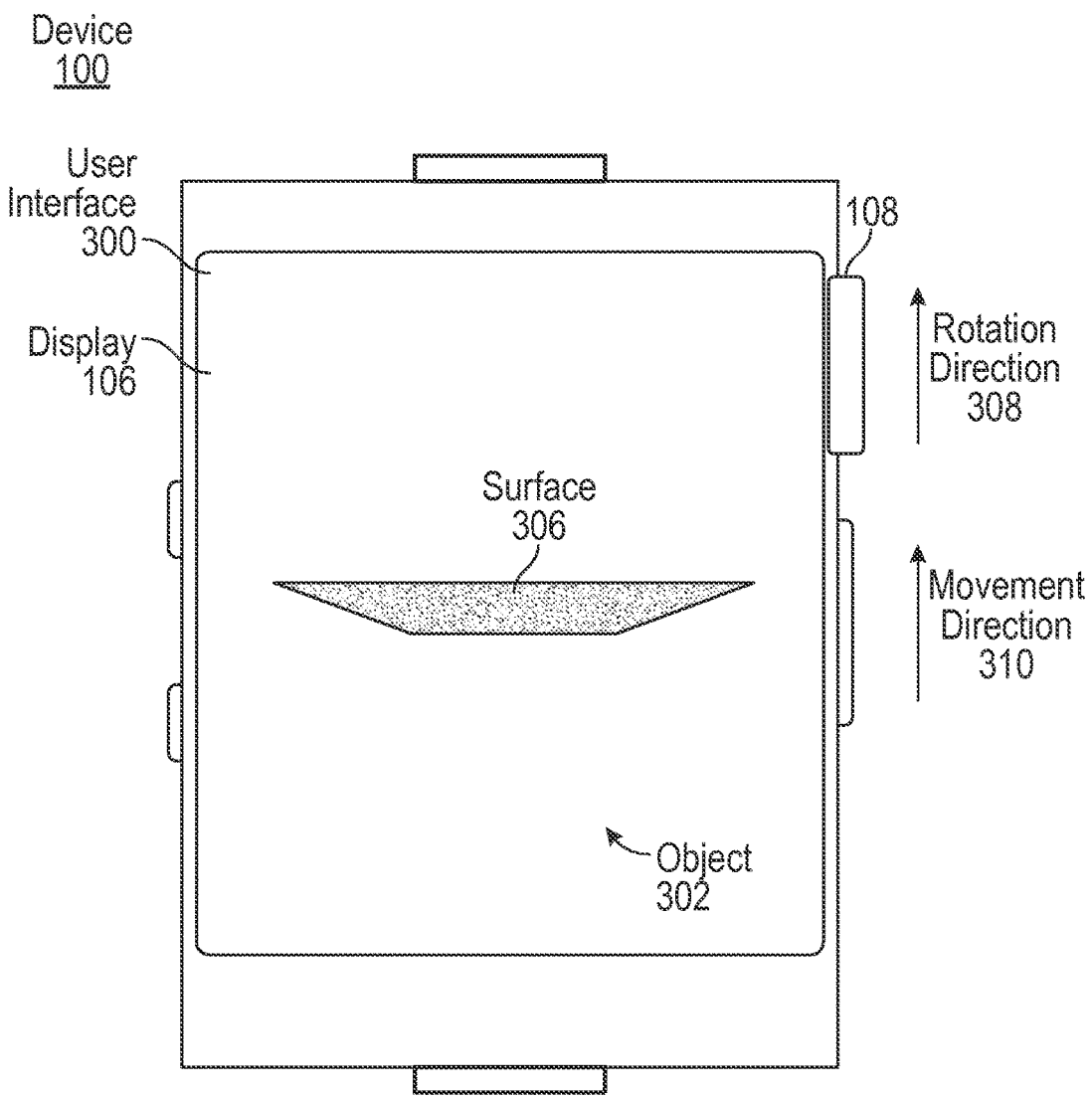
Figure 9:
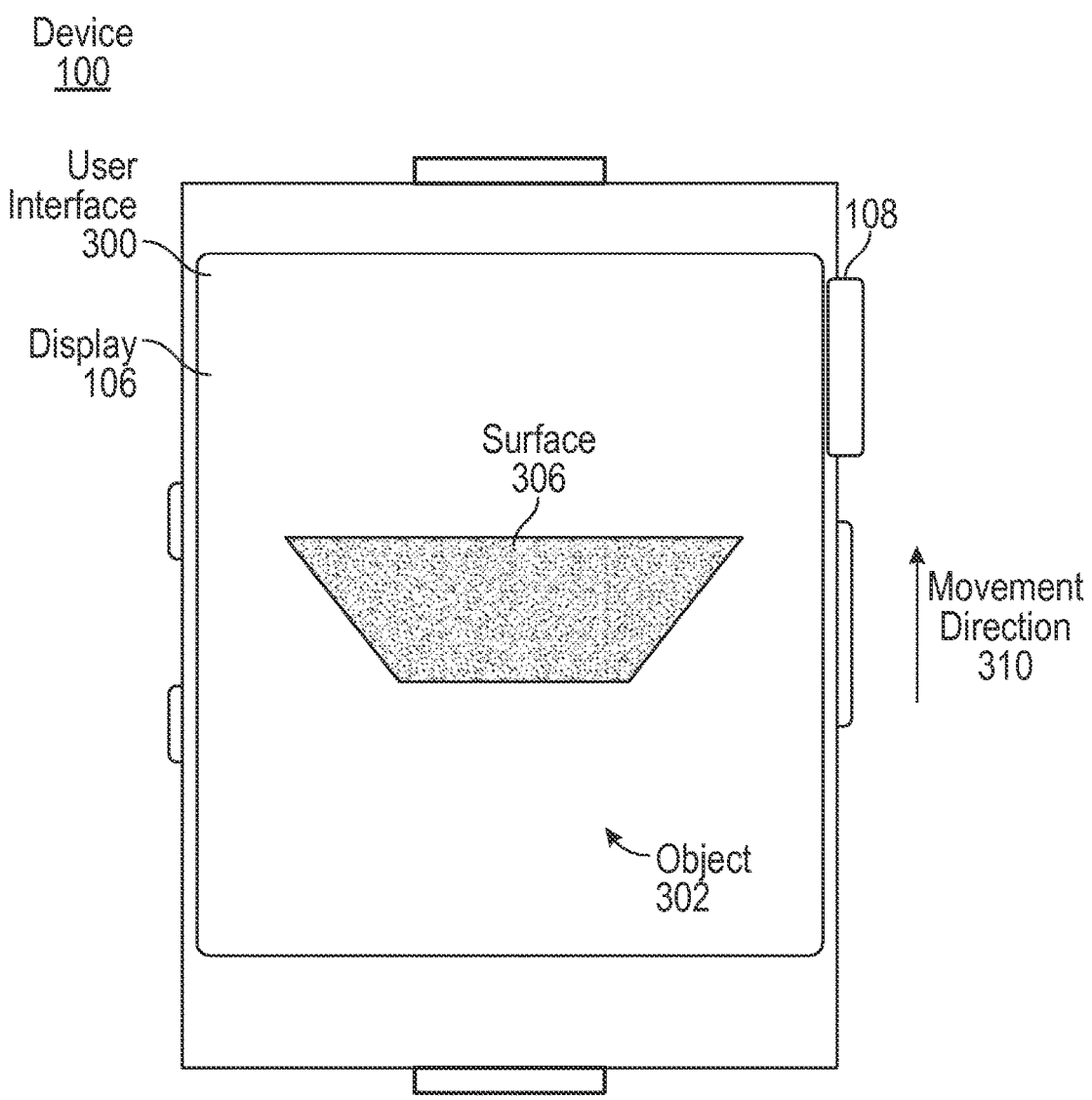
Figure 10:
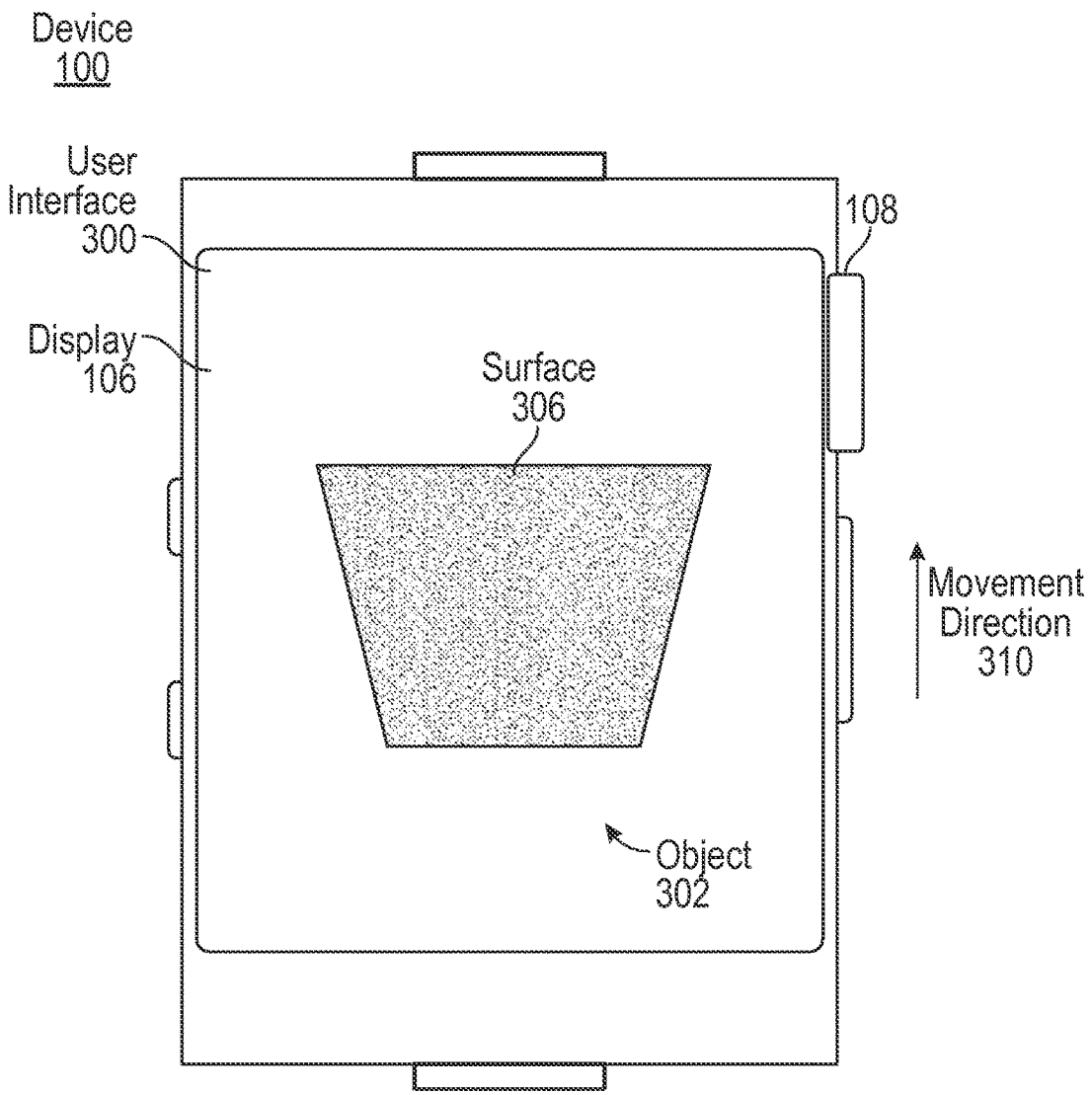
Figure 11:
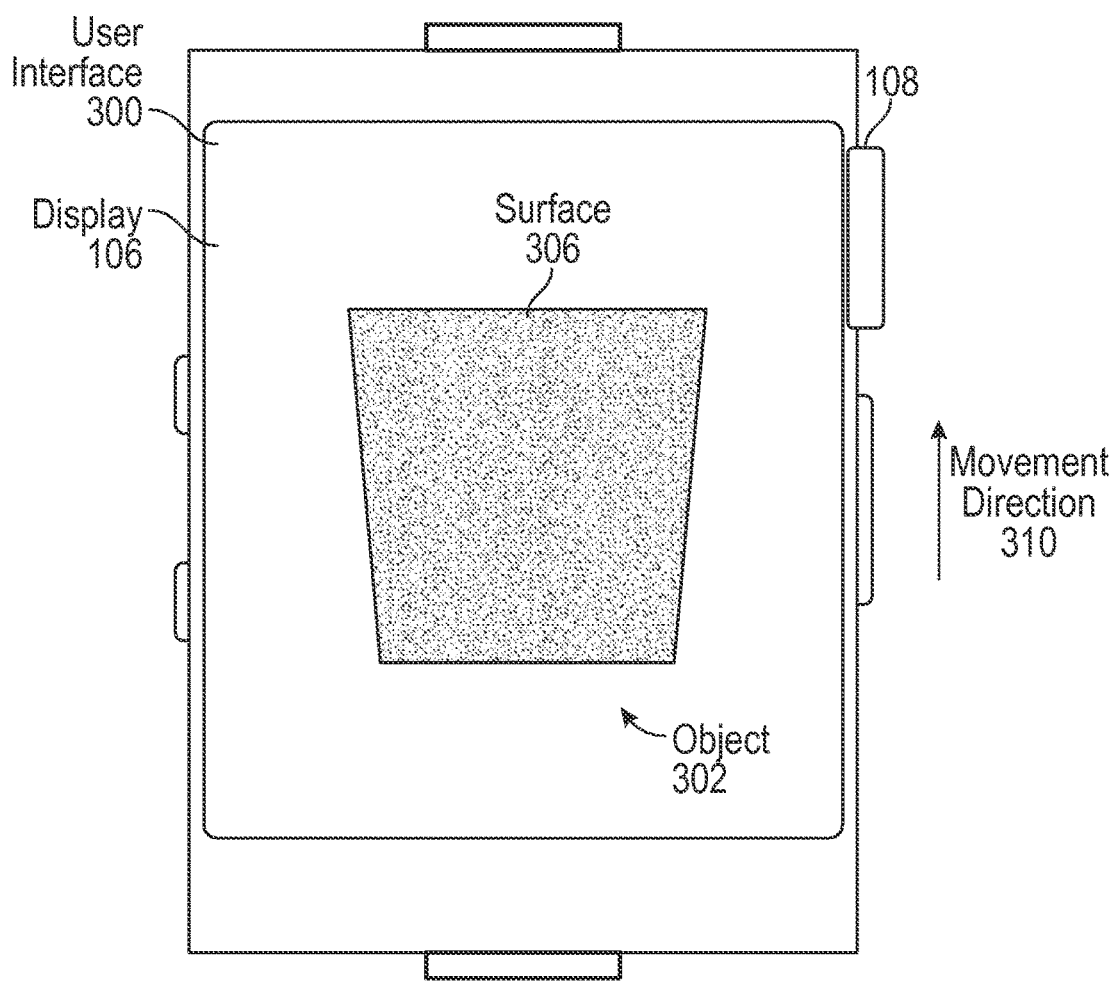
Figure 12:
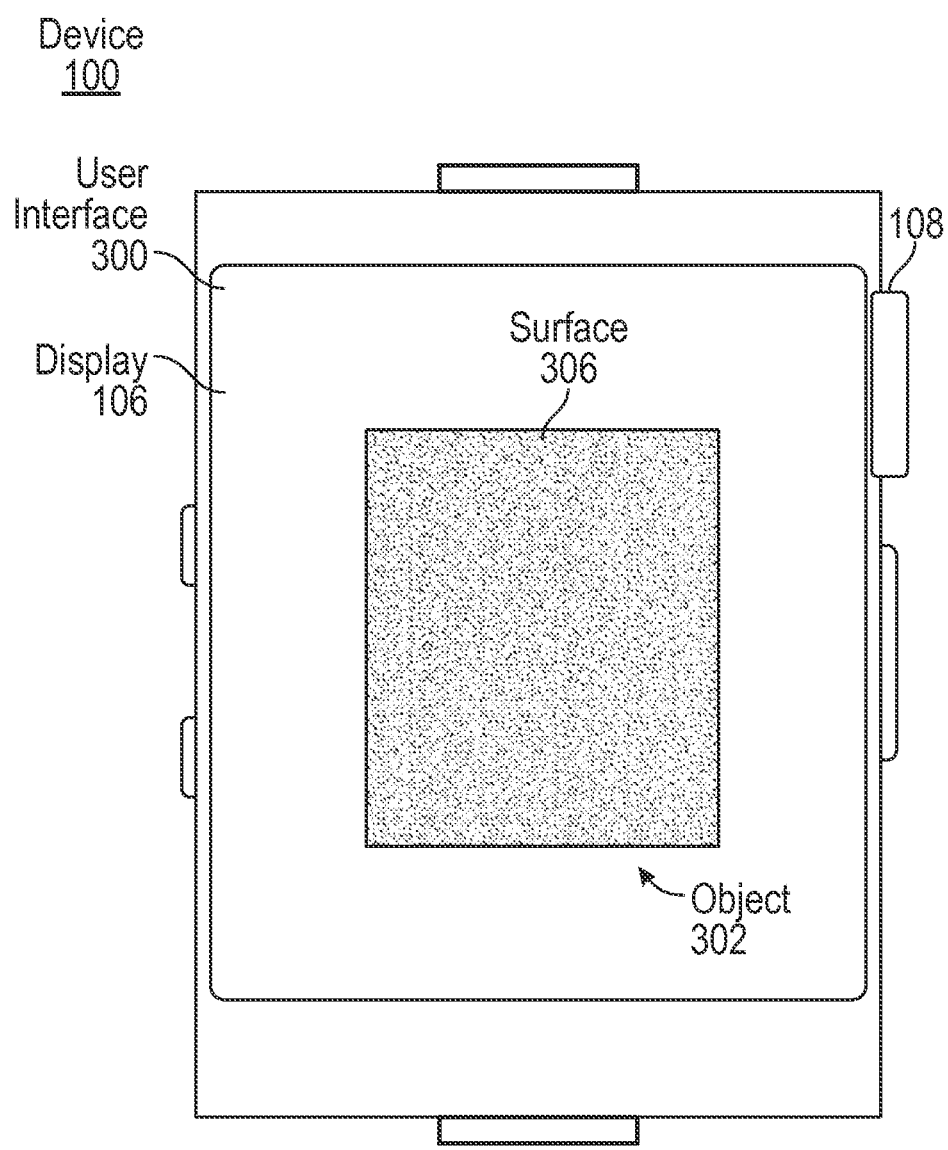

At FIGS. 5-7, device 100 continues to determine a change in the position of crown 108 in the clockwise direction, as indicated by rotation direction arrow 308. Device 100 determines a rotational speed and a direction based on the determined change in the position of crown 108. In response to determining the change in the position of crown 108, the device continues to rotate object 302, as indicated by movement direction arrow 310 and illustrated in FIG. 5-6. The rotation of object 302 is based on the determined rotational speed and direction.

In one example, the degrees of rotation of object 302, as measured from the object's position while parallel to display 106, is based on the determined speed. For easier visualization, object 302 can be thought of as having some similar qualities as an analog tachometer. As the determined speed increases, the degree of rotation of object 302 increases. In this example, if the rotation of crown 108 is maintained at a constant speed, object 302 will stay at a static rotated position that is not parallel to display 106. If the speed of the rotation of crown 108 is increased, the determined speed will increase and object 302 will rotate an additional amount.

In some examples, object 302 is configured to become perpendicular to display 106 in response to the determined speed being at a speed threshold. When the determined speed exceeds the speed threshold, object 302 exceeds a total rotation of 90 degrees, causing first surface 304 of object 302 to no longer be displayed and instead causing second surface 306 of object 302 to be displayed. This transition between the display of first surface 304 and second surface 306 is illustrated as the transition between FIGS. 7 and 8. Thus, as the determined speed exceeds the speed threshold the object 302 flips from one side to another side.

At FIGS. 9-12, device 100 determines that there is no further change in the position of crown 108. As a result of this determination, the rotation of object 302 is changed such that a surface of object 302 is parallel to display 106. This change may be animated, as illustrated in FIGS. 9-12. Device 100 will rotate object 302 such that the surface of object 302 partially facing display 106 when device 100 determines that there is no change in the position of crown 108 is the surface that will be displayed as being parallel to display 106. When a surface of object 302 is parallel to display 106 and no change in the position of crown 108 is detected, object 302 is in a steady state. An object is in a steady state when the object is not being translated, rotated, or scaled.

In some examples, when object 302 is in a steady state, the displayed surface of object 302 that is parallel to display 106 can be activated with an additional input. The displayed surface that is parallel to display 106 in a steady state is determined to be selected even prior to activation. For example, object 302 may be used as an ON/OFF switch or toggle. First surface 304 is associated with an ON instruction and second surface 306 is associated with an OFF instruction. A user can transition between the ON and OFF states by rotating crown 108 at above a speed threshold, causing object 302 to flip and display a desired surface. The desired surface is determined to be selected when the desired surface is displayed on display 106, is parallel to display 106, and no change in the position of crown 108 is detected.

While a surface is selected, the user can activate the selected surface by one or more of many techniques. For example, the user may press on touch-sensitive display 106, press on touch-sensitive display with a force greater than a predetermined threshold, press button 112, or simply allow the surface to remain selected for a predetermined amount of time. In another example, when the displayed surface is parallel to display 106, the action can be interpreted as both a selection and an activation of the data associated with the displayed surface.

Figure 13:
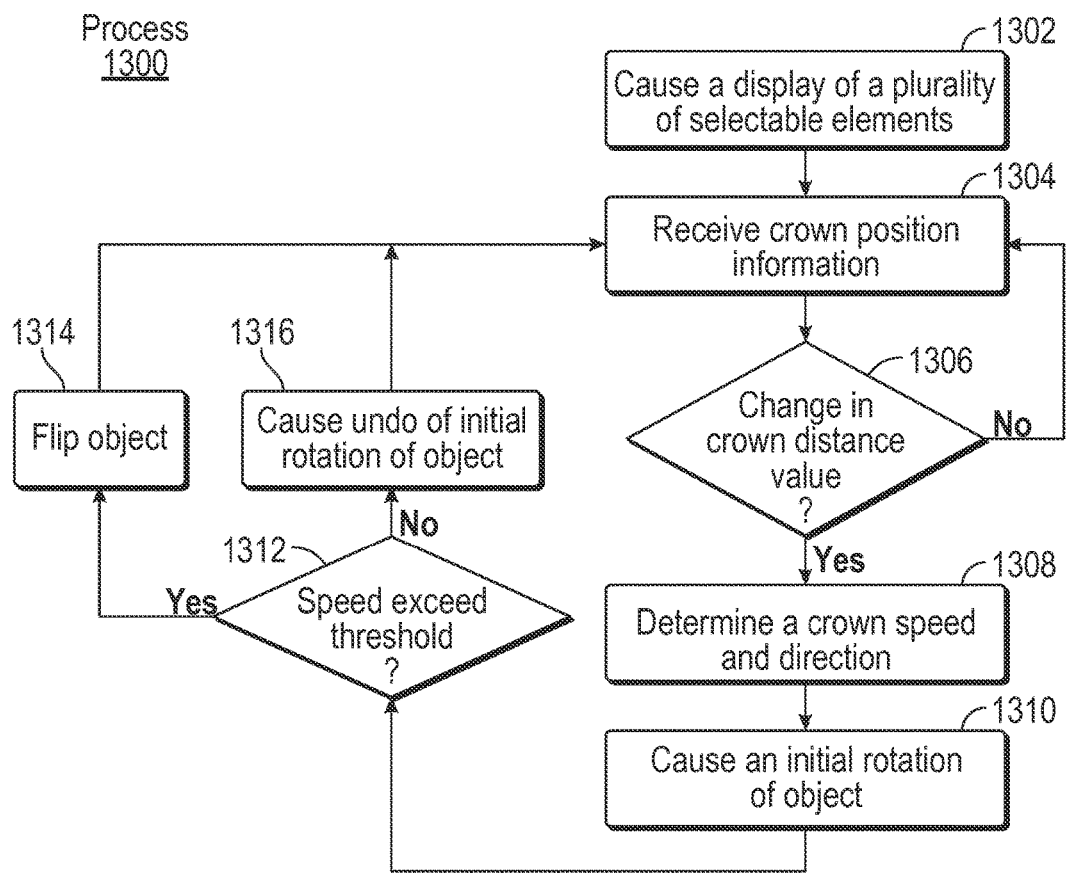
FIG. 13 illustrates an exemplary process for selecting a surface of a two-sided object in response to a rotation of a crown.

FIG. 13 illustrates an exemplary process for selecting a surface of a two-sided graphical user interface object in response to a rotation of a crown. Process 1300 is performed at a wearable electronic device (e.g., device 100 in FIG. 1) having a physical crown. In some examples, the electronic device also includes a touch-sensitive display. The process provides an efficient technique for selecting a surface of a two-sided, two-dimensional object.

At block 1302, the device causes a display of a two-sided object on a touch-sensitive display of a wearable electronic device. In some examples, the object is two-dimensional. In other examples, the object is three dimensional but only two surfaces are selectable. Each selectable surface of the object is associated with a corresponding data value. The data may be, for example, text, an image, an application icon, an instruction, a binary ON or OFF option, and the like.

At block 1304, the device receives crown position information. The crown position information may be received as a series of pulse signals, real values, integer values, and the like.

At block 1306, the device determines whether a change has occurred in a crown distance value. The crown distance value is based on an angular displacement of the physical crown of the wearable electronic device. A change in the crown distance value is indicative of a user providing input to the wearable electronic device by, for example, turning the physical crown. If the device determines that a change in the crown distance value has not occurred, the system returns to block 1304 and continues receiving crown position information. If the device determines that a change in the crown distance value has occurred, the system continues to block 1308, though the system may continue to receive crown position information.

At block 1308, the device determines a direction and a crown speed. The crown speed is based on the speed of rotation of the physical crown of the wearable electronic device. For example, the determined crown speed may be expressed as hertz, as rotations per unit of time, as rotations per frame, as revolutions per unit of time, as revolutions per frame, and the like. The determined direction is based on a direction of rotation of the physical crown of the wearable electronic device. For example, an up direction can be determined based on a clockwise rotation of the physical crown. Similarly, a down direction can be determined based on a counterclockwise rotation of the physical crown. In other examples, a down direction can be determined based on a clockwise rotation of the physical crown and an up direction can be determined based on a counterclockwise rotation of the physical crown.

At block 1310, in response to determining the change in the crown distance value, the device causes an initial rotation of the two-sided object on the display. The amount of the rotation is based on the determined crown speed. The direction of rotation is based on the determined direction. The rotation may be animated.

At block 1312, the device determines whether the determined crown speed exceeds a speed threshold. If the device determines that the determined crown speed exceeds the speed threshold, the device continues to block 1314. For example, the speed threshold may be thought of as an escape velocity (or escape speed). An escape velocity is the speed at which the kinetic energy plus the gravitational potential energy of an object is zero. If the device determines that the determined crown speed does not exceed the speed threshold, the device transitions to block 1316.

In some examples, the minimum angular velocity of crown rotation that is necessary to reach escape velocity corresponds directly to the instantaneous angular velocity of crown 108 (FIG. 1), meaning that the user interface of device 100, in essence, responds when crown 108 reaches a sufficient angular velocity. In some embodiments, the minimum angular velocity of crown rotation necessary for reaching the escape velocity is a calculated velocity that is based on, but not directly equal to, the instantaneous ("current") angular velocity of crown 108. In these examples, device 100 can maintain a calculated crown (angular) velocity V in discrete moments in time T according to equation 1:

$$V_T = V_{(T-1)} + \Delta V_{CROWN} - \Delta V_{DRAG}. \quad \text{(EQ. 1)}$$

In equation 1, $V_T$ represents a calculated crown velocity (speed and direction) at time T, $V_{(T-1)}$ represents the previous velocity (speed and direction) at time T−1, $\Delta V_{CROWN}$ represents the change in velocity caused by the force being applied through the rotation of the crown at time T, and $\Delta V_{DRAG}$ represents the change in velocity due to a drag force. The force being applied, which is reflected through $\Delta V_{CROWN}$, can depend on the current velocity of angular rotation of the crown. Thus, $\Delta V_{CROWN}$ can also depend on the current angular velocity of the crown. In this way, device 100 can provide user interface interactions based not only on instantaneous crown velocity but also based on user input in the form of crown movement over multiple time intervals, even if those intervals are finely divided. Note, typically, in the absence of user input in the form of $\Delta V_{CROWN}$, $V_T$ will approach (and become) zero based on $\Delta V_{DRAG}$ in accordance with EQ. 1, but $V_T$ would not change signs without user input in the form of crown rotation ($\Delta V_{CROWN}$).

Typically, the greater the velocity of angular rotation of the crown, the greater the value of $\Delta V_{CROWN}$ will be. However, the actual mapping between the velocity of angular rotation of the crown and $\Delta V_{CROWN}$ can be varied depending on the desired user interface effect. For example, various linear or non-linear mappings between the velocity of angular rotation of the crown and $\Delta V_{CROWN}$ can be used.

Also, $\Delta V_{DRAG}$ can take on various values. For example, $\Delta V_{DRAG}$ can depend on the velocity of crown rotation such that at greater velocities, a greater opposing change in velocity ($\Delta V_{DRAG}$) can be produced. In another example, $\Delta V_{DRAG}$ can have a constant value. It should be appreciated that the above-described requirements of $\Delta V_{CROWN}$ and $\Delta V_{DRAG}$ can be changed to produce desirable user interface effects.

As can be seen from EQ. 1, the maintained velocity ($V_T$) can continue to increase as long as $\Delta V_{CROWN}$ is greater than $\Delta V_{DRAG}$. Additionally, $V_T$ can have non-zero values even when no $\Delta V_{CROWN}$ input is being received, meaning that user interface objects can continue to change without the user rotating the crown. When this occurs, objects can stop changing based on the maintained velocity at the time the user stops rotating the crown and the $\Delta V_{DRAG}$ component.

In some examples, when the crown is rotated in a direction corresponding to a rotation direction that is opposite the current user interface changes, the $V_{(T-1)}$ component can be reset to a value of zero, allowing the user to quickly change the direction of the object without having to provide a force sufficient to offset the $V_T$.

At block 1314, the device causes the object to flip past a transition position between a first surface that was last selected and a second surface. For example, the object has flipped past the transition position when the object will not return to having the first surface displayed parallel to the display without receiving additional user input. In the example of a two-sided object, the transition position may be when the surface is perpendicular to the display.

Once the object reaches a steady state, the displayed surface that is parallel to the display can be activated by a designated user input. The displayed surface that is parallel to the display in a steady state is determined to be selected even prior to activation. An object is in a steady state when the object is not being translated, rotated, or scaled. This may result in the first surface of the object no longer being displayed, in the case of a cube-shaped object.

At block 1316, because the escape velocity has not been reached, the device causes the object to at least partially return to the object's initial position at the time of block 1302. For example, part of the initial rotation of the object caused at block 2410 can be negated. To achieve this, the device animates a rotation of the object that is in an opposite direction of the initial rotation at block 1310.

FIGS. 14-23 illustrate an exemplary graphical user interface showing the selection of a surface of a cube object in response to a rotation of a crown. Object 1402 is a cube with six surfaces. In this example, four of the six surfaces are selectable. These four selectable surfaces include surface 1404 of object 1402, which is facing a viewer of display 106, the top surface of object 1402, the bottom surface of object 1402, and the back surface of object 1402. In this example, the left and right surfaces of object 1402 are not selectable. However, the left and right surfaces of object 1402 may be selectable in other examples. Although examples are described with respect to object surfaces (or planes) being parallel to display 106, the examples can also be modified to instead be described with respect to object surfaces (or planes) facing the viewer of display 106. This modification may be particularly helpful when object surfaces or display 106 is not plane surface.

Each selectable surface of object 1402 is associated with corresponding data. The data may be, for example, text, an image, an application icon, an instruction, a quad-state setting (such as Off/Low/Medium/High), and the like. A user can select a surface from among the multiple selectable surfaces of the object 1402 by using a physical crown of a wearable electronic device to rotate object 1402 to align the desired selection surface such that it is parallel to the display 106 and displayed on display 106.

Crown 108 of device 100 is a user rotatable user interface input. The crown 108 can be turned in two distinct directions: clockwise and counterclockwise. FIGS. 14-23 include rotation direction arrows illustrating the direction of crown rotation and movement direction arrows illustrating the direction of rotation of a user interface object, where applicable. The rotation direction arrows and movement direction arrows are typically not part of the displayed user interface, but are provided to aid in the interpretation of the figures. In this example, a clockwise direction rotation of crown 108 is illustrated by a rotation direction arrow pointing in the up direction. Similarly, a counterclockwise direction rotation of crown 108 is illustrated by a rotation direction arrow pointing in the down direction. The characteristics of the rotation direction arrow are not indicative of the distance, speed, or acceleration with which crown 108 is rotated by a user. Instead, the rotation direction arrow is indicative of the direction of rotation of crown 108 by the user.

Figure 14:
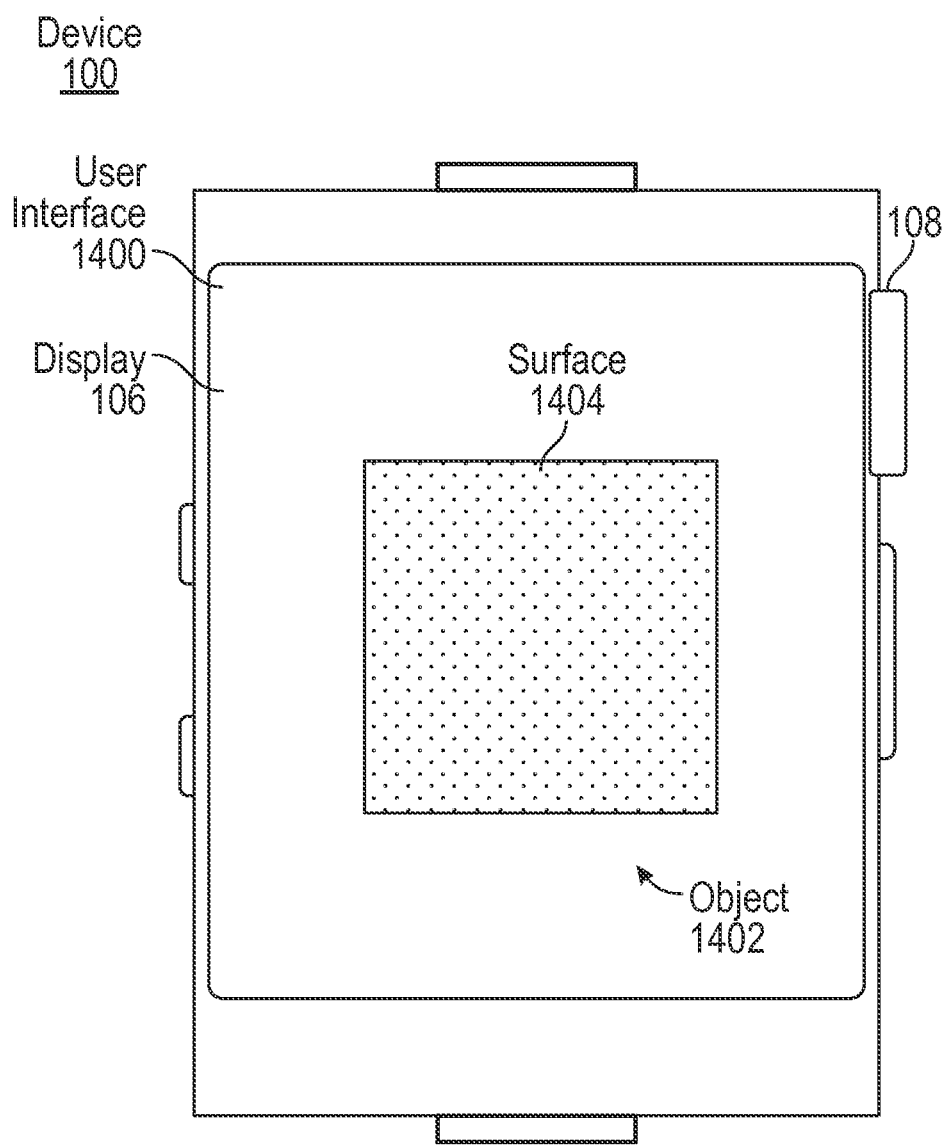
FIGS. 14-23 illustrate an exemplary graphical user interface showing the selection of a surface of an object in response to a rotation of a crown.
Figure 15:
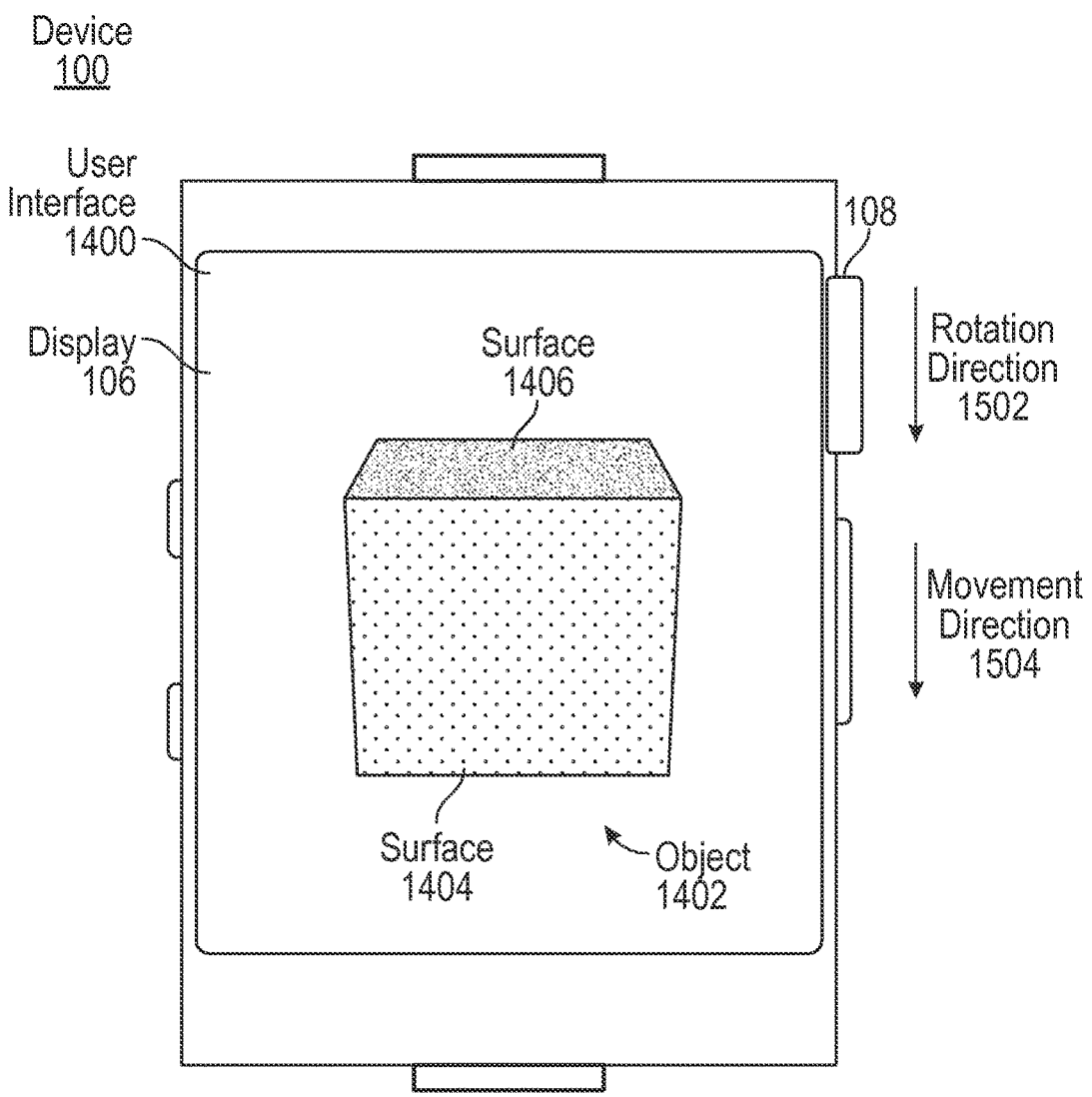

At FIG. 14, first surface 1404 of object 1402 is aligned parallel to display 106 and is displayed, indicating selection of first surface 1404. At FIG. 15, device 100 determines a change in the position of crown 108 in the counterclockwise direction, as indicated by rotation direction arrow 1502. Device 100 determines a rotational speed and a direction based on the determined change in the position of crown 108. In response to determining the change in the position of crown 108, the device rotates object 1402, as indicated by movement direction arrow 1504 and illustrated in FIG. 15. The rotation of object 1402 is based on the determined rotational speed and direction. Rotational speed may be expressed in numerous ways. For example, rotational speed may be expressed as hertz, as rotations per unit of time, as rotations per frame, as revolutions per unit of time, as revolutions per frame, and the like. In one example, object 1402 may be associated with a mass or may have a calculated rotational inertia.

Figure 16:
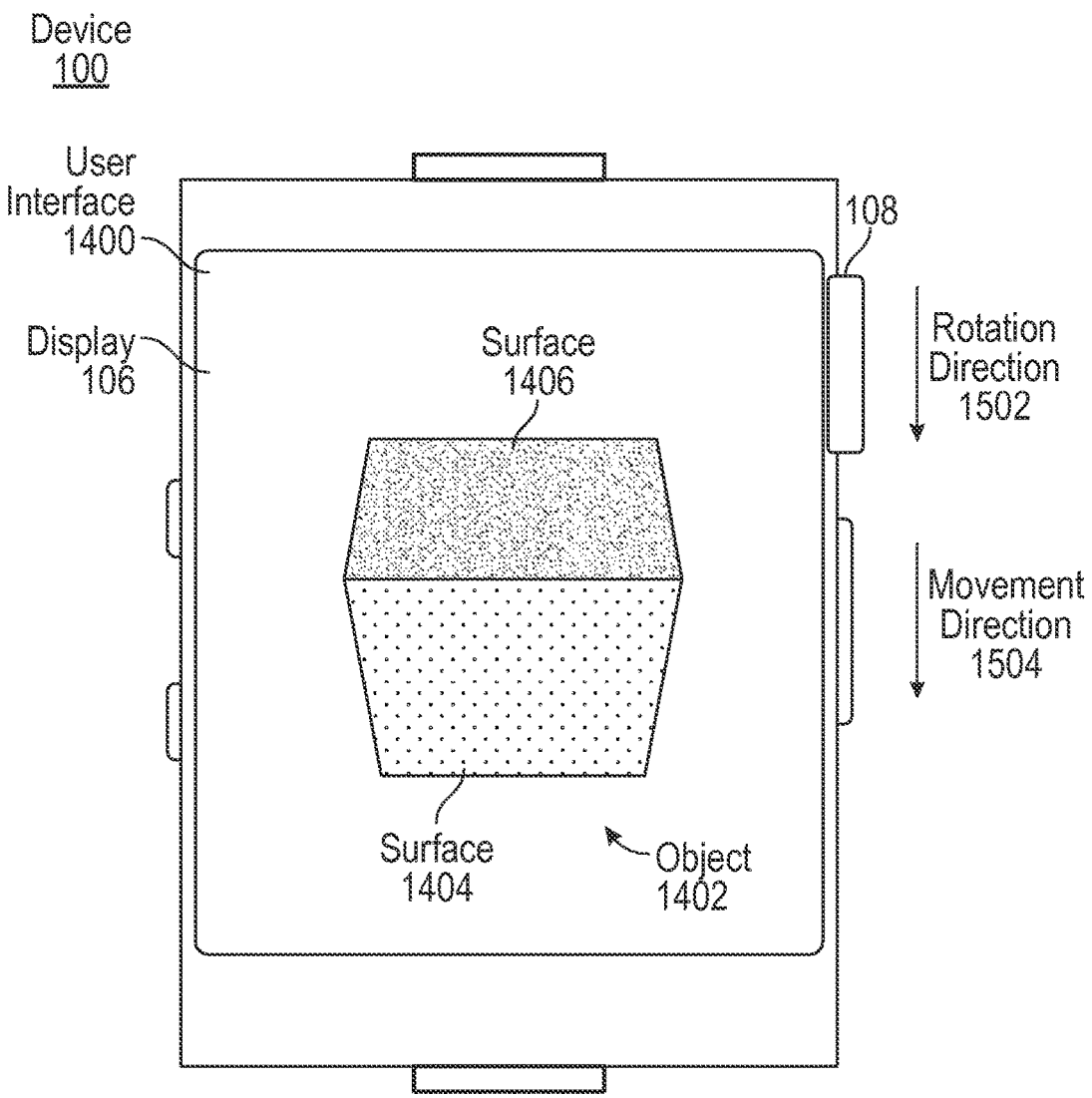

At FIG. 16, device 100 continues to determine a change in the position of crown 108 in the counterclockwise direction, as indicated by rotation direction arrow 1502. Device 100 determines a rotational speed and a direction based on the determined change in the position of crown 108. In response to determining the change in the position of crown 108, the device continues to rotate object 1402, as indicated by movement direction arrow 1504 and illustrated in FIG. 16. The rotation of object 1402 is based on the determined rotational speed and direction.

In one example, the degrees of rotation of object 1402 is based on the determined speed. As the determined speed increases, the degree of rotation of object 1402 increases. In this example, if the rotation of crown 108 is maintained at a constant speed, object 1402 will stay at a static rotated position where no surface of object 1402 is parallel to display 106. If the speed of the rotation of crown 108 is increased, the determined speed will increase and object 1402 will rotate an additional amount.

In some examples, object 1402 is configured to rotate to have a surface parallel to display 106 in response to the determined speed being above a speed threshold. When the determined speed exceeds the speed threshold, object 1402 exceeds a rotation of 45 degrees, causing first surface 1404 of object 1402 to rotate away from the display to no longer be displayed and instead causing second surface 1406 of object 1402 to rotate toward the display to be displayed. This transition between the display of first surface 1404 and second surface 1406 is illustrated as the transition between FIGS. 16 and 17. Thus, as the determined speed exceeds the speed threshold, the object 1402 flips from one surface to another surface.

Figure 17:
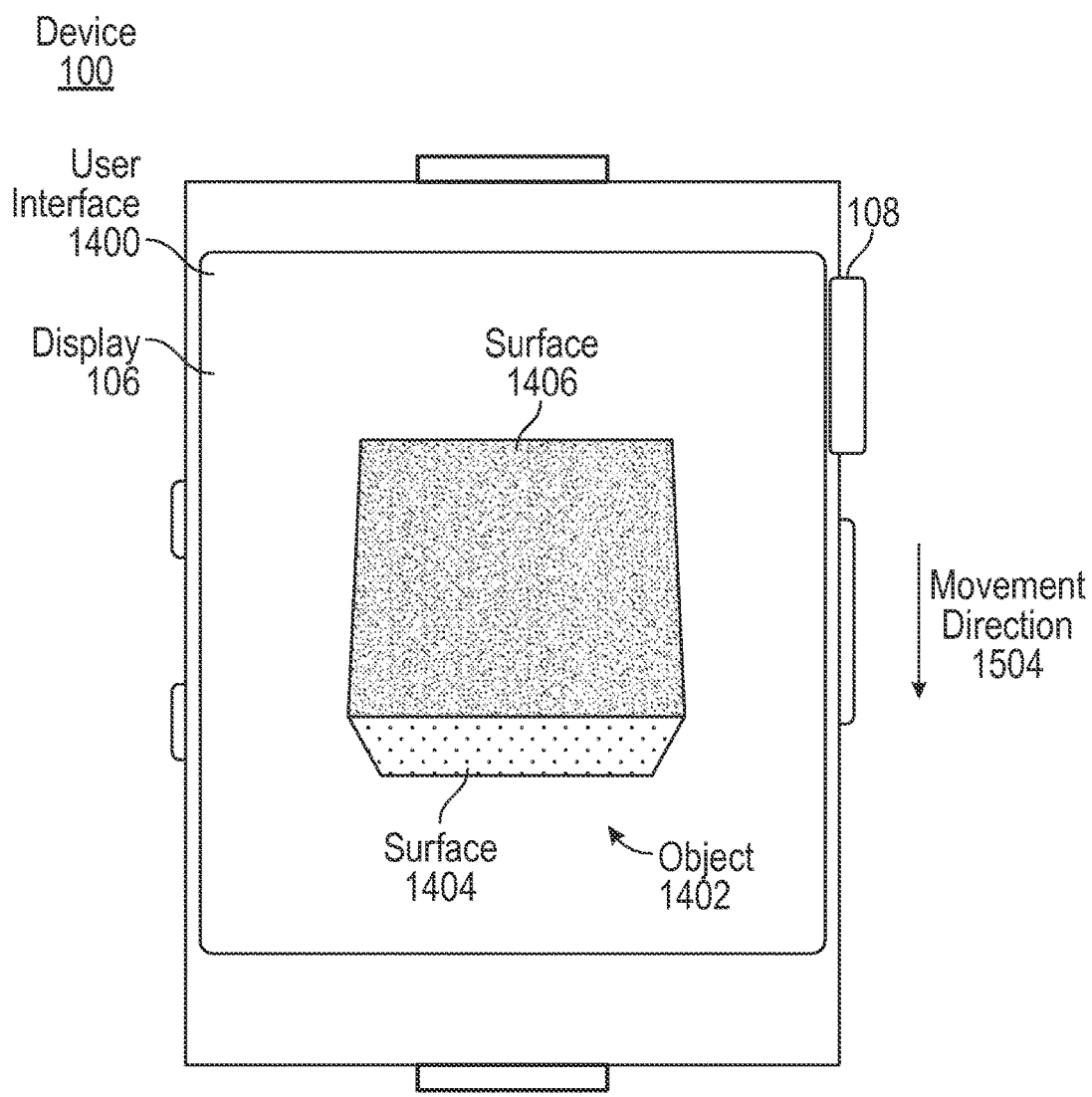
Figure 18:
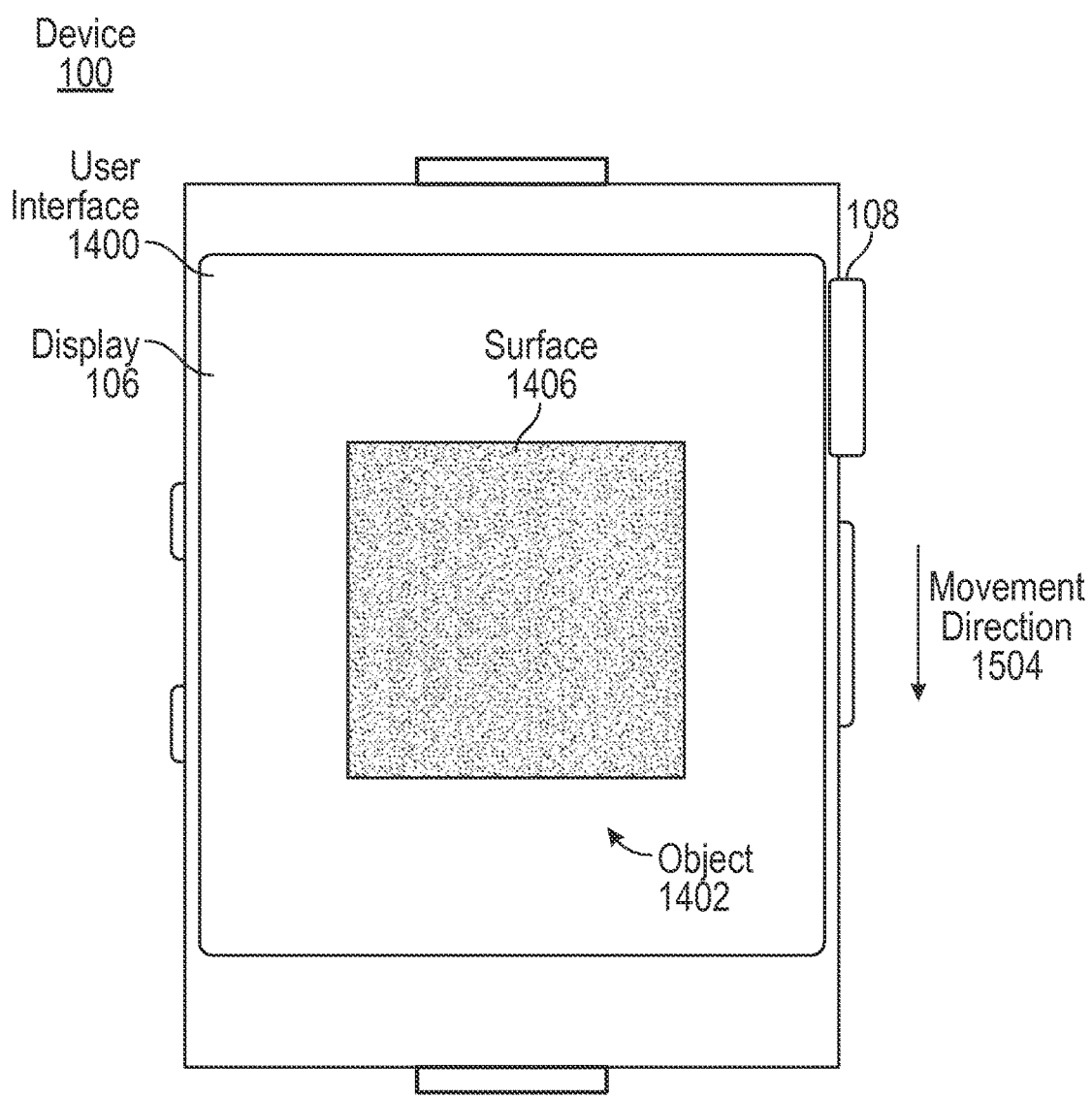
Figure 19:
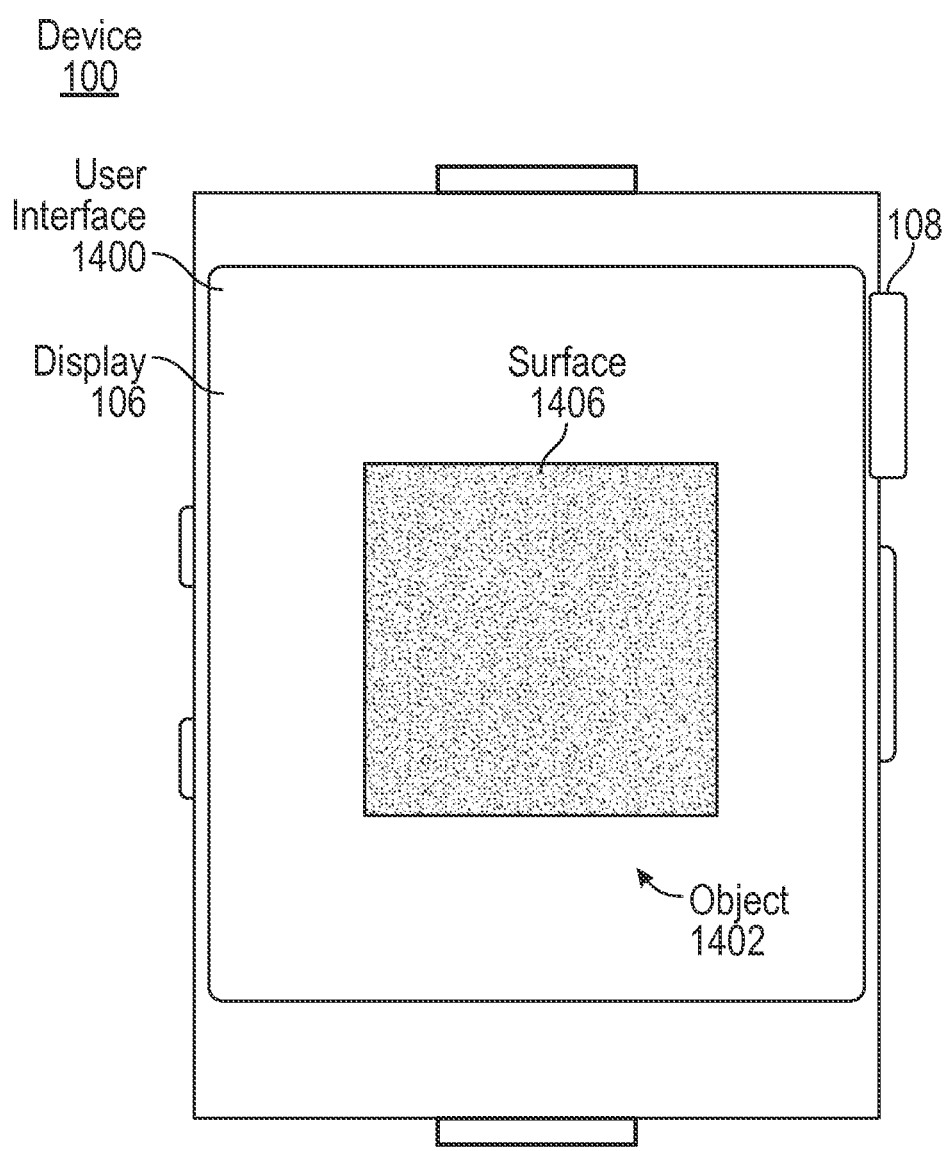
Figure 20:
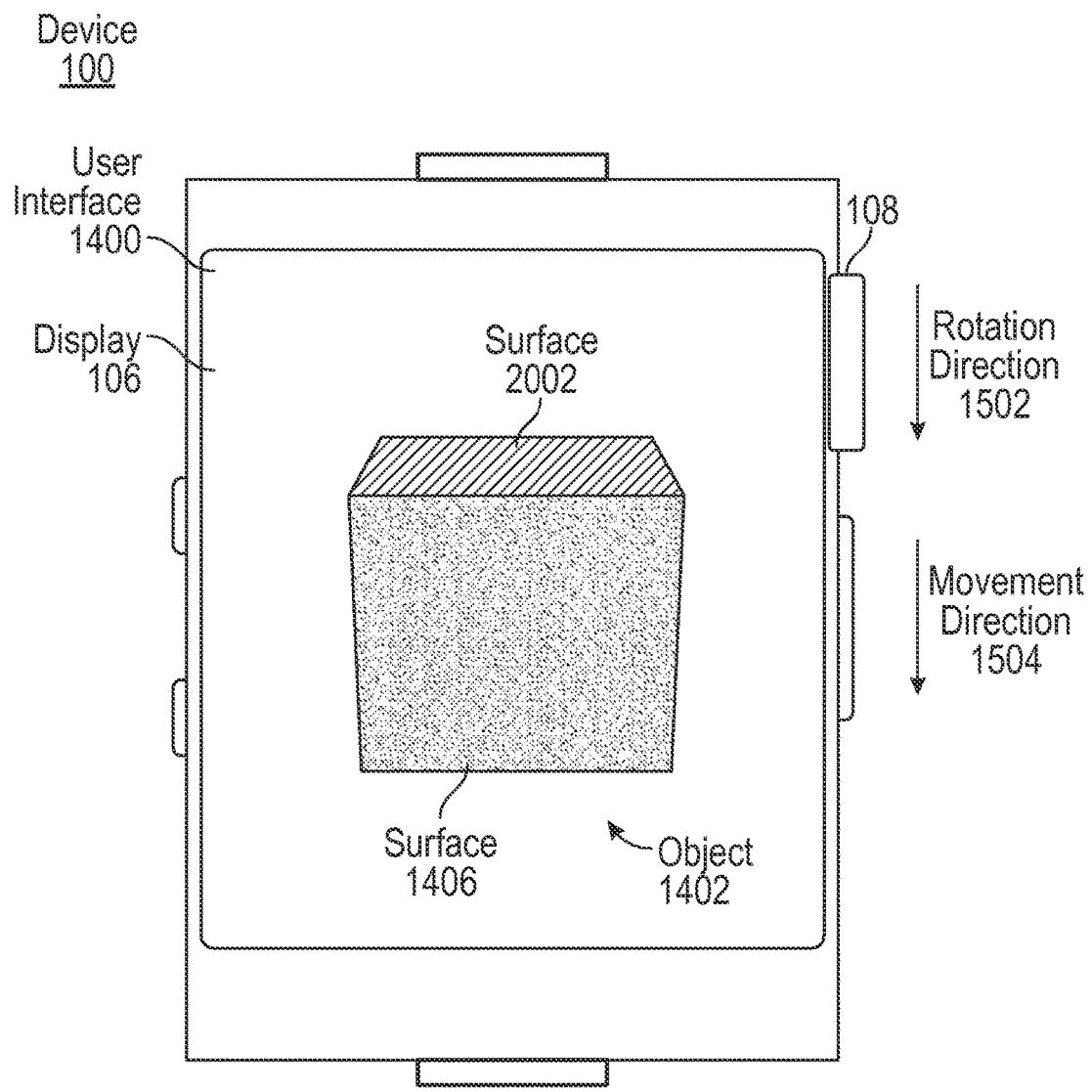

At FIGS. 17-18, device 100 determines that there is no change in the position of crown 108. As a result of this determination, object 1402 is rotated such that a displayed surface of object 1402 is parallel to display 106. This rotation may be animated, as illustrated in FIGS. 17-18. Device 100 will rotate object 1402 such that the displayed surface of object 1402 that has the smallest angle with respect to the display is made parallel to the display 106. In other words, the object's surface that best faces the display 106 or is closest to parallel to display 106 is made parallel to the display 106. When a surface of object 1402 is parallel to display 106 and no change in the position of crown 108 is detected, object 1402 is in a steady state. An object is in a steady state when the object is not being translated, rotated, or scaled.

In some examples, when object 1402 is in a steady state, the surface of object 1402 that is parallel to display 106 and displayed on display 106 is determined to be selected. For example, object 1402 may be used as four-phase selection switch. First surface 1404 is associated with a LOW setting instruction and second surface 1406 is associated with a MEDIUM instruction setting. The remaining two selectable surfaces are associated with HIGH and OFF instruction settings. A user can transition between the four settings by rotating crown 108 at above a speed threshold, causing object 1402 to flip and display a desired surface. The desired surface is determined to be selected when the displayed surface is parallel to display 106 and no change in the position of crown 108 is detected.

While a surface is selected, the user can activate the selected surface by one or more of many techniques. For example, the user may press on touch-sensitive display 106, press button 112, or simply allow the surface to remain selected for a predetermined amount of time. In another example, when the displayed surface is parallel to display 106, the action can be interpreted as both a selection and an activation of the data associated with the displayed surface.

Figure 21:
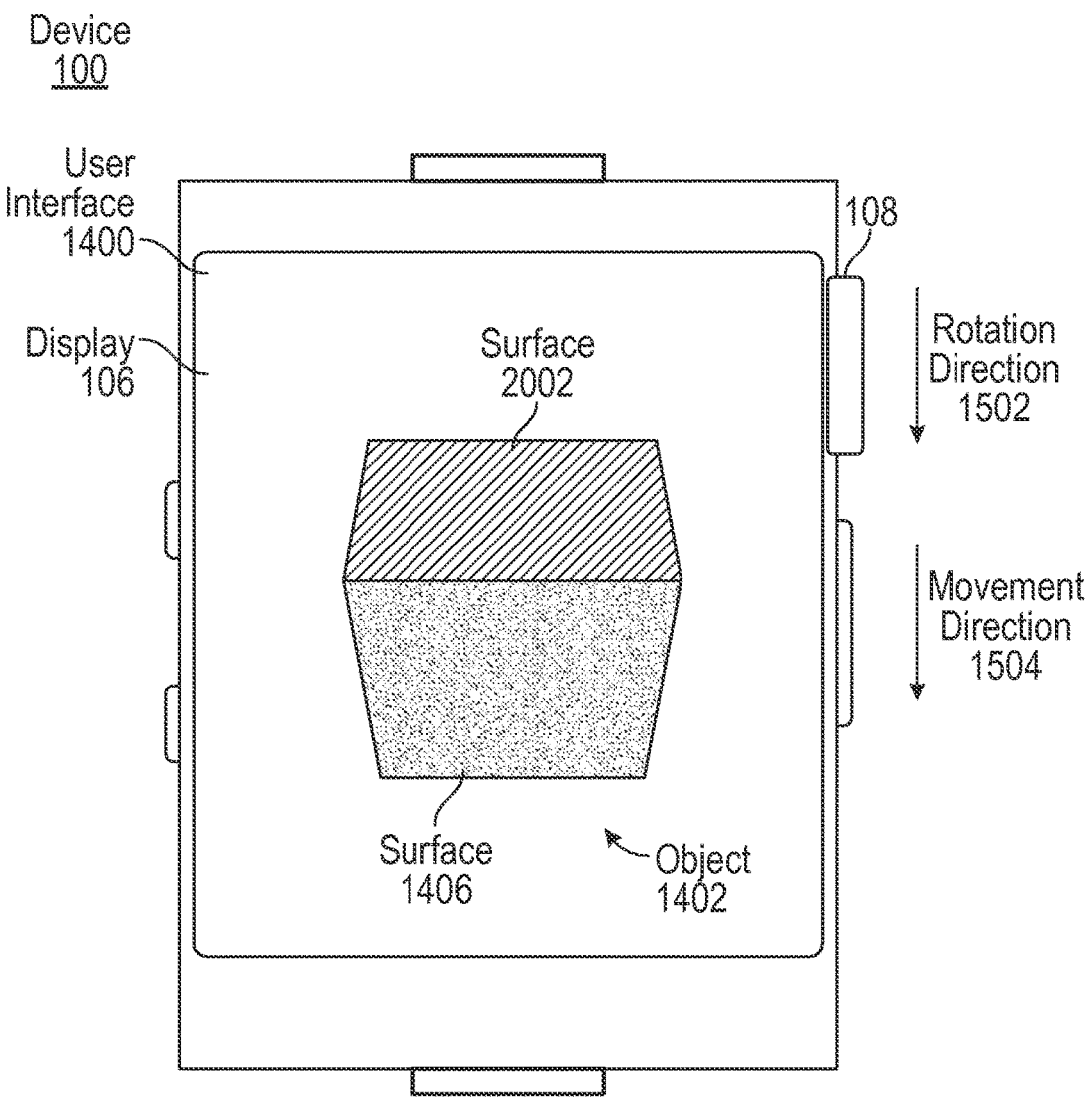
Figure 22:
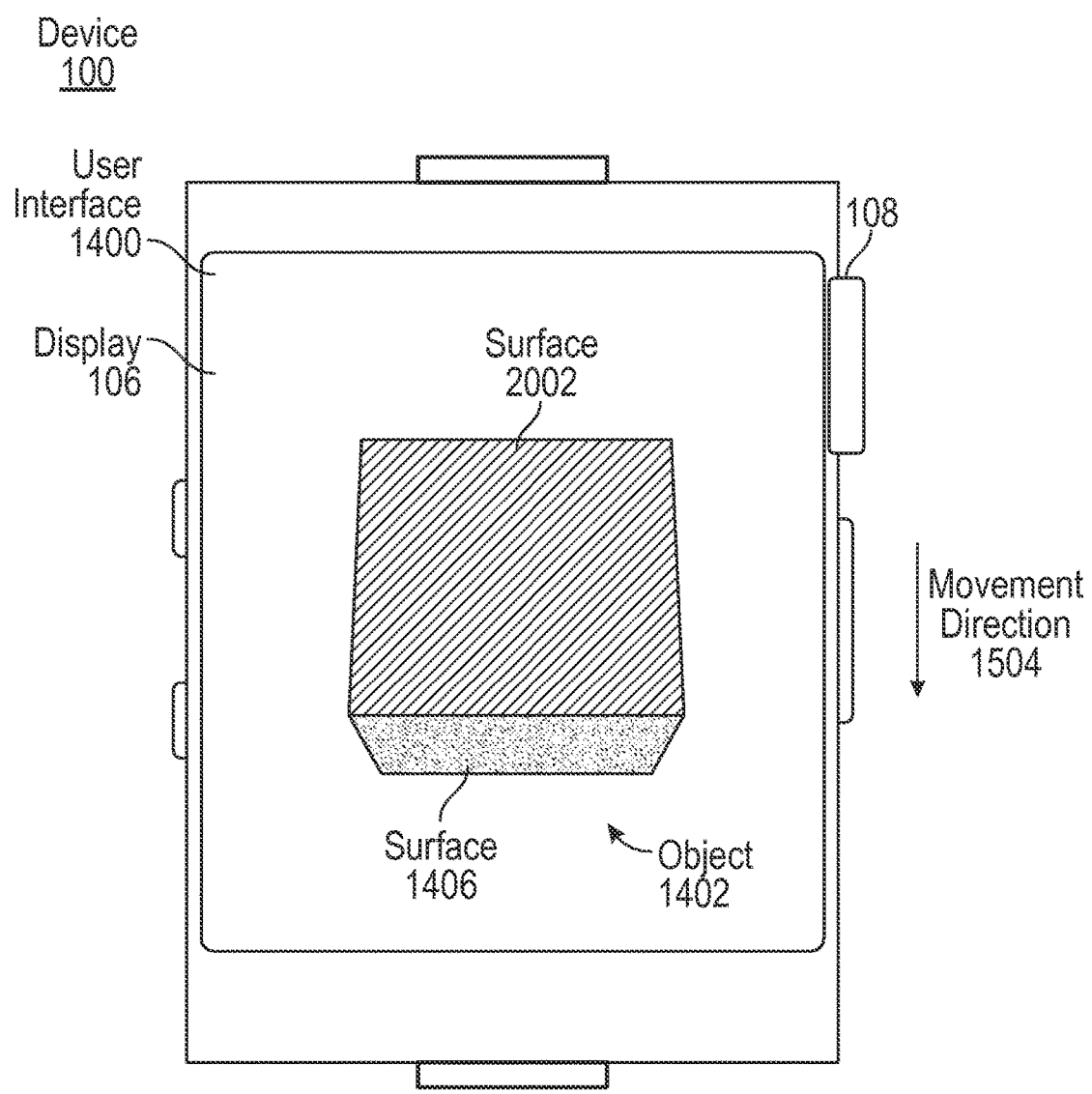

FIGS. 20-23 illustrate a second flip of object 1402 to select third surface 2002 of object 1402. In FIGS. 21-22, device 100 determines a change in the position of crown 108 in the counterclockwise direction, as indicated by rotation direction arrow 1502. Device 100 determines a rotational speed and a direction based on the determined change in the position of crown 108. In response to determining the change in the position of crown 108, the device rotates object 1402, as indicated by movement direction arrow 1504 and illustrated in FIG. 21-22. The rotation of object 1402 is based on the determined rotational speed and direction.

Figure 23:
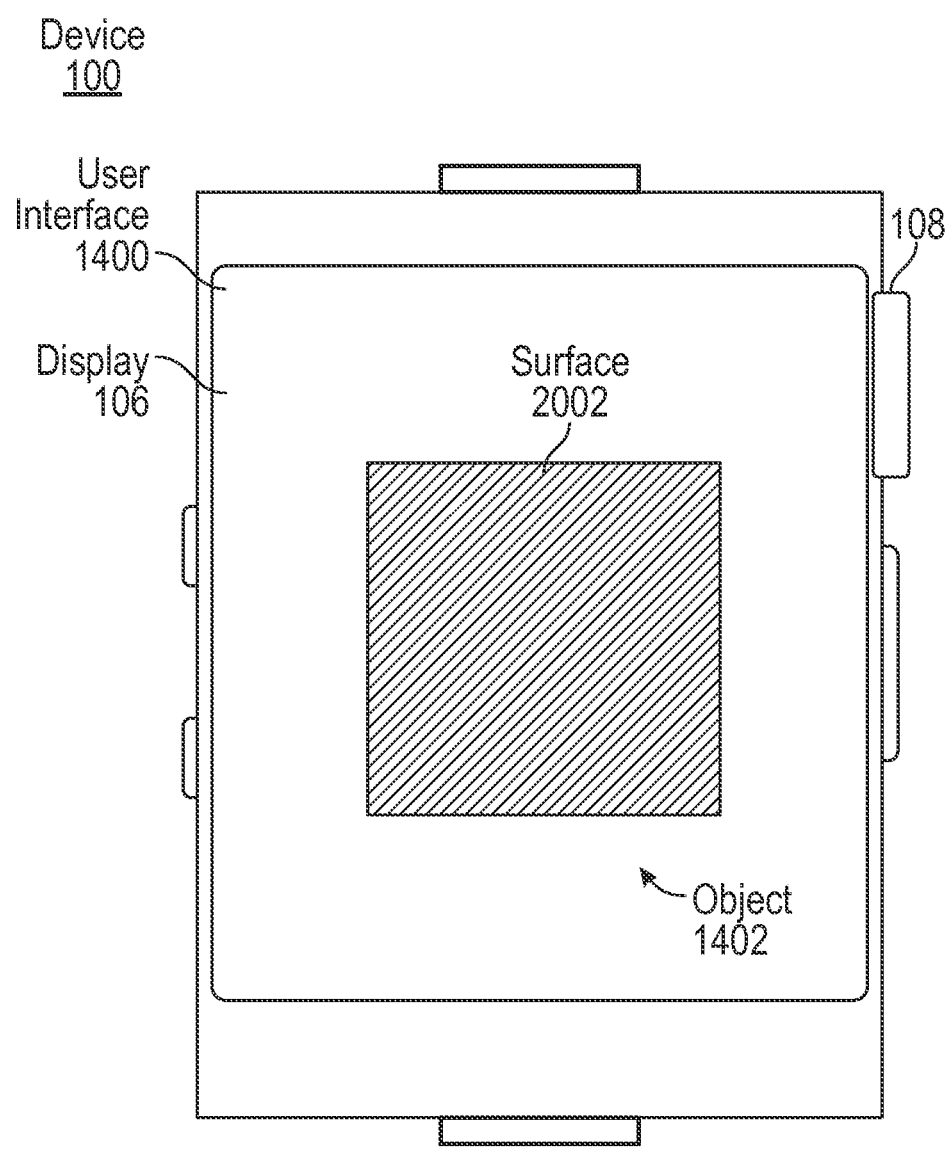

In response to the rotational speed exceeding a threshold, object 1402 flips to cause third surface 2002 to be parallel to display 106 and to be displayed on display 106, as illustrated in FIG. 23. An object is in a steady state when the object is not being translated, rotated, or scaled. When object 1402 is in a steady state, the surface of object 1402 that is parallel to display 106 and displayed on display 106 is determined to be selected. In this example, third surface 2002 is selected.

Figure 24:
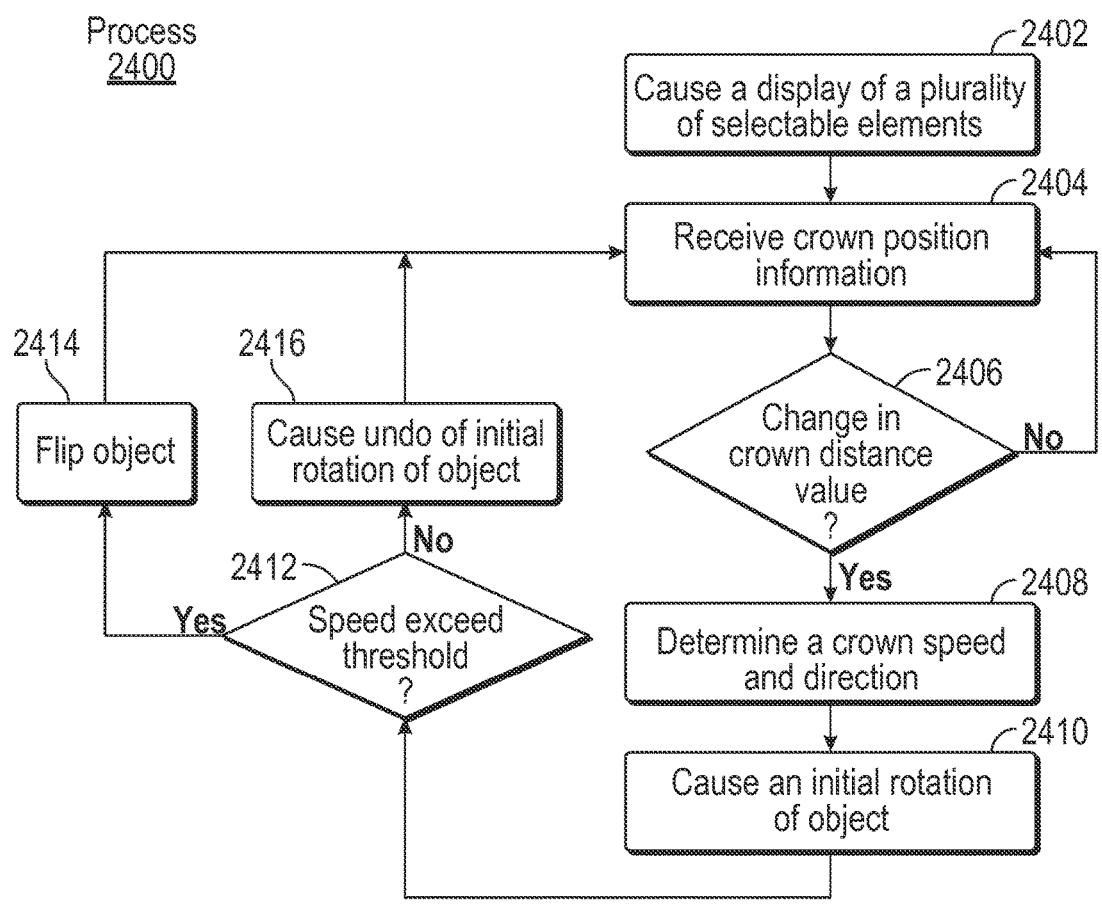
FIG. 24 illustrates an exemplary process for selecting a surface of an object in response to a rotation of a crown.

FIG. 24 illustrates an exemplary process for selecting a surface of a multi-sided graphical user interface object in response to a rotation of a crown. Process 2400 is performed at a wearable electronic device (e.g., device 100 in FIG. 1) having a physical crown. In some examples, the electronic device also includes a touch-sensitive display. The process provides an efficient technique for selecting a surface of a multi-sided, three-dimensional object.

At block 2402, the device causes a display of a multi-sided object on a touch-sensitive display of a wearable electronic device. Each selectable surface of the object is associated with a corresponding data value. The data may be, for example, text, an image, an application icon, an instruction, and the like.

At block 2404, the device receives crown position information. The crown position information may be received as a series of pulse signals, real values, integer values, and the like.

At block 2406, the device determines whether a change has occurred in a crown distance value. The crown distance value is based on an angular displacement of the physical crown of the wearable electronic device. A change in the crown distance value is indicative of a user providing input to the wearable electronic device by, for example, turning the physical crown. If the device determines that a change in the crown distance value has not occurred, the system returns to block 2404 and continues receiving crown position information. If the device determines that a change in the crown distance value has occurred, the system continues to block 2408, though the system may continue to receive crown position information.

At block 2408, the device determines a direction and a crown speed. The crown speed is based on the speed of rotation of the physical crown of the wearable electronic device. For example, the determined crown speed may be expressed as hertz, as rotations per unit of time, as rotations per frame, as revolutions per unit of time, as revolutions per frame, and the like. The determined direction is based on a direction of rotation of the physical crown of the wearable electronic device. For example, an up direction can be determined based on a clockwise rotation of the physical crown. Similarly, a down direction can be determined based on a counterclockwise rotation of the physical crown. In other examples, a down direction can be determined based on a clockwise rotation of the physical crown and an up direction can be determined based on a counterclockwise rotation of the physical crown.

At block 2410, in response to determining the change in the crown distance value, the device causes an initial rotation of the multi-sided object on the display. The amount of the rotation is based on the determined crown speed. The direction of rotation is based on the determined direction. The rotation may be animated.

At block 2412, the device determines whether the determined crown speed exceeds a speed threshold. If the device determines that the determined crown speed exceeds the speed threshold, the device continues to block 2414. For example, the speed threshold may be thought of as an escape velocity (or escape speed). An escape velocity is the speed at which the kinetic energy plus the gravitational potential energy of an object is zero. If the device determines that the determined speed does not exceed the speed threshold, the device continues to block 2416.

In some examples, the minimum angular velocity of crown rotation that is necessary to reach escape velocity corresponds directly to the instantaneous angular velocity of crown 108 (FIG. 1), meaning that the user interface of device 100, in essence, responds when crown 108 reaches a sufficient angular velocity. In some embodiments, the minimum angular velocity of crown rotation necessary for reaching the escape velocity is a calculated velocity that is based on, but not directly equal to, the instantaneous ("current") angular velocity of crown 108. In these examples, device 100 can maintain a calculated crown (angular) velocity V in discrete moments in time T according to equation 1:

$$V_T = V_{(T-1)} + \Delta V_{CROWN} - \Delta V_{DRAG}. \quad (EQ. 1)$$

In equation 1, $V_T$ represents a calculated crown velocity (speed and direction) at time T, $V_{(T-1)}$ represents the previous velocity (speed and direction) at time T−1, $\Delta V_{CROWN}$ represents the change in velocity caused by the force being applied through the rotation of the crown at time T, and $\Delta V_{DRAG}$ represents the change in velocity due to a drag force. The force being applied, which is reflected through $\Delta V_{CROWN}$, can depend on the current velocity of angular rotation of the crown. Thus, $\Delta V_{CROWN}$ can also depend on the current angular velocity of the crown. In this way, device 100 can provide user interface interactions based not only on instantaneous crown velocity but also based on user input in the form of crown movement over multiple time intervals, even if those intervals are finely divided. Note, typically, in the absence of user input in the form of $\Delta V_{CROWN}$, $V_T$ will approach (and become) zero based on $\Delta V_{DRAG}$ in accordance with EQ. 1, but $V_T$ would not change signs without user input in the form of crown rotation ($\Delta V_{CROWN}$).

Typically, the greater the velocity of angular rotation of the crown, the greater the value of $\Delta V_{CROWN}$ will be. However, the actual mapping between the velocity of angular rotation of the crown and $\Delta V_{CROWN}$ can be varied depending on the desired user interface effect. For example, various linear or non-linear mappings between the velocity of angular rotation of the crown and $\Delta V_{CROWN}$ can be used.

Also, $\Delta V_{DRAG}$ can take on various values. For example, $\Delta V_{DRAG}$ can depend on the velocity of crown rotation such that at greater velocities, a greater opposing change in velocity ($\Delta V_{DRAG}$) can be produced. In another example, $\Delta V_{DRAG}$ can have a constant value. It should be appreciated that the above-described requirements of $\Delta V_{CROWN}$ and $\Delta V_{DRAG}$ can be changed to produce desirable user interface effects.

As can be seen from EQ. 1, the maintained velocity ($V_T$) can continue to increase as long as $\Delta V_{CROWN}$ is greater than $\Delta V_{DRAG}$. Additionally, $V_T$ can have non-zero values even when no $\Delta V_{CROWN}$ input is being received, meaning that user interface objects can continue to change without the user rotating the crown. When this occurs, objects can stop changing based on the maintained velocity at the time the user stops rotating the crown and the $\Delta V_{DRAG}$ component.

In some examples, when the crown is rotated in a direction corresponding to a rotation direction that is opposite the current user interface changes, the $V_{(T-1)}$ component can be reset to a value of zero, allowing the user to quickly change the direction of the object without having to provide a force sufficient to offset the $V_T$.

At block 2414, the device causes the object to flip past a transition position between a first surface that was last selected and a new surface. For example, the object has flipped past the transition position when the object will not return to having the first surface displayed parallel to the display without receiving additional user input.

Once the object reaches a steady state, the displayed surface that is parallel to the display can be activated through a designated user input. The displayed surface parallel to the display in the steady state is determined to be selected even before activation. An object is in a steady state when the object is not being translated, rotated, or scaled. This may result in the first surface of the object no longer being displayed, in the case of a cube-shaped object.

At block 2416, because the escape velocity has not been reached, the device causes the object to at least partially return to the object's initial position at the time of block 2408. For example, part of the initial rotation of the object caused at block 2410 can be negated. To achieve this, the device animates a rotation of the object that is in an opposite direction of the initial rotation at block 2410.

Figure 25:
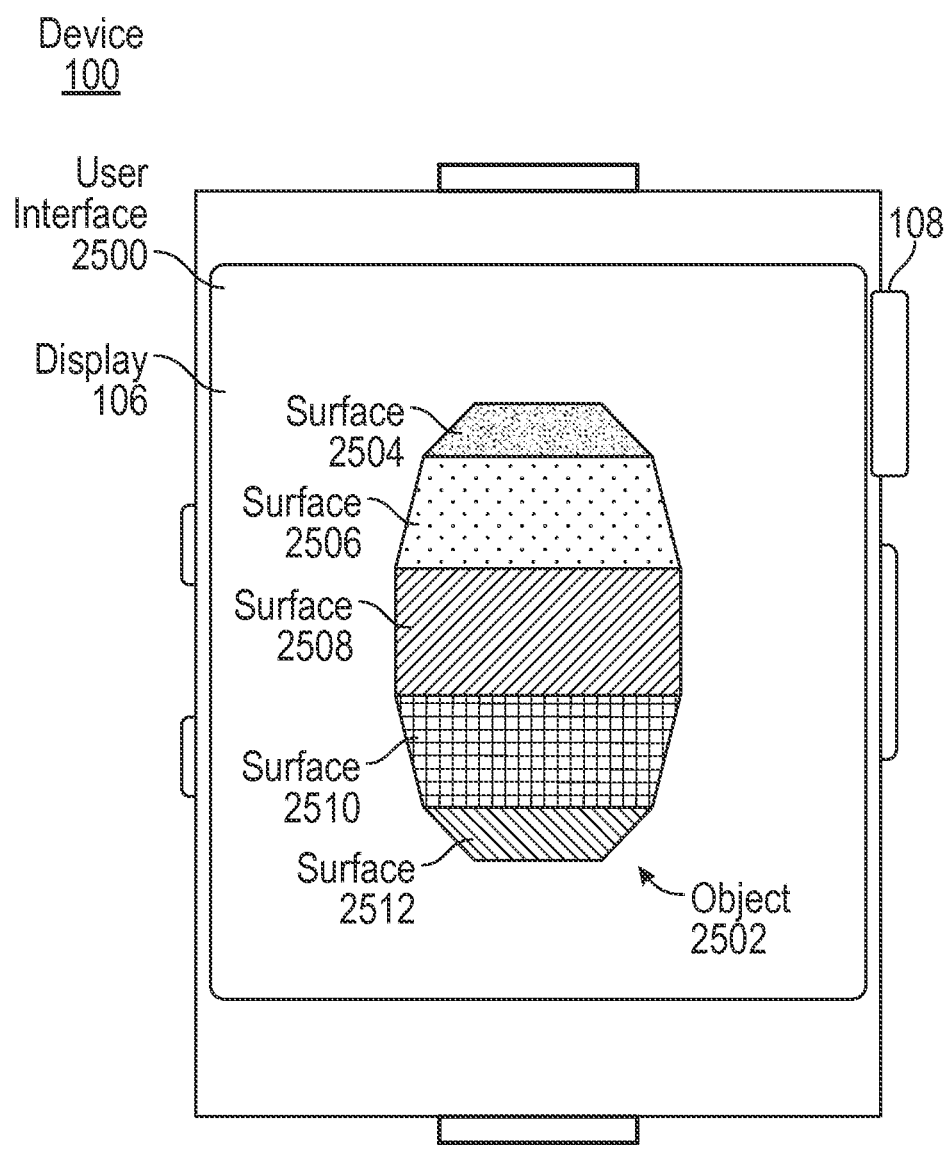
FIG. 25 illustrates an exemplary multi-sided object in a graphical user interface.

FIG. 25 illustrates a graphical user interface 2500 showing the selection of a surface 2506 of a multi-sided object in response to a rotation of a crown. Object 2502 is a 12-sided rotatable dial, shaped similar to a wheel. Object 2502 is rotatable along a fixed axis. In this example, all 12 surfaces of object 2502 are selectable. These 12 selectable surfaces include surface 2504, surface 2506, surface 2508, surface 2510, and surface 2512. In FIG. 25, surface 2508 is selected because surface 2508 is parallel to display 106 and is displayed on display 106. The selectable surfaces of object 2505 can be selected according to the processes and techniques described in other examples.

In some examples, device 100 can provide haptic feedback based on the content displayed on the display 106. When a user interface object is displayed on display 106, the device can modify the appearance of the object based on a change in a crown distance value received at the device 100 based on a rotation of crown 108. When a criterion is satisfied, a tactile output is output at the device 100.

In one example, the object is a rotatable multi-sided object, such as is described above. The criterion is satisfied when a surface of the multi-sided object is selected. In another example, the criterion is satisfied each time a displayed surface of the multi-sided object passes through a plane parallel to the display.

Figure 26:
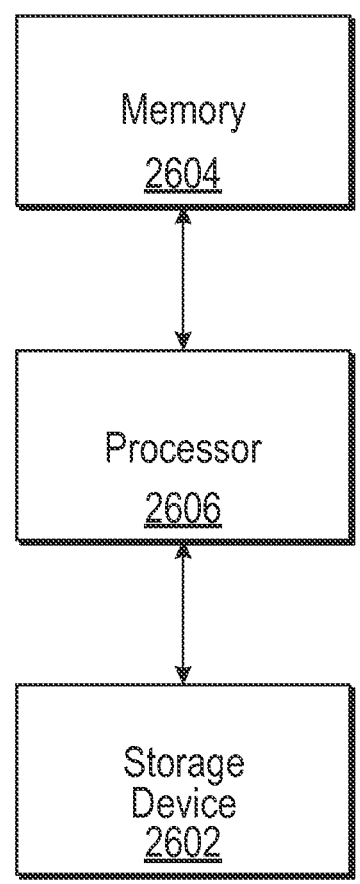
FIG. 26 illustrates an exemplary computing system for manipulating a user interface in response to a rotation of a crown according to various examples.

One or more of the functions relating to a user interface can be performed by a system similar or identical to system 2600 shown in FIG. 26. System 2600 can include instructions stored in a non-transitory computer readable storage medium, such as memory 2604 or storage device 2602, and executed by processor 2606. The instructions can also be stored and/or transported within any non-transitory computer readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM), a read-only memory (ROM), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The instructions can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

In some examples, system 2600 can be included within device 100. In these examples, processor 2606 can be the same or a different process than processor 202. Processor 2606 can be configured to receive the output from encoder 204, buttons 110, 112, and 114, and from touch-sensitive display 106. Processor 2606 can process these inputs as described above with respect to the processes described and illustrated. It is to be understood that the system is not limited to the components and configuration of FIG. 26, but can include other or additional components in multiple configurations according to various examples.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the appended claims.

What is claimed is:

1. A computer-implemented method comprising:
   displaying a first surface of a plurality of selectable surfaces of a virtual object on a touch-sensitive display of a wearable electronic device, the first surface associated with a first data;
   detecting rotation of a physical crown of the wearable electronic device;
   determining a speed, wherein the speed is based on an angular velocity of the physical crown during the detected rotation of the wearable electronic device;
   in response to detecting rotation of the physical crown, displaying, on the display, an animation of rotating the virtual object about an axis parallel to the display in a first direction; and
   after rotating the virtual object about the axis parallel to the display in the first direction:
   in response to the speed being determined to exceed a speed threshold, displaying, on the display, an animation of continuing to rotate the virtual object rotating about an axis parallel to the display in the first direction to display a second surface of the plurality of selectable surfaces of the virtual object on the display, the second surface displayed parallel to the display while in a steady state; and
   in response to a determination that the speed is below the speed threshold, displaying, on the display, an animation of rotating the virtual object about the axis parallel to the display in a second direction that is opposite to the first direction to display the first surface of the plurality of selectable surfaces of the virtual object on the display, the first surface displayed parallel to the display while in the steady state.

2. The computer-implemented method of claim 1, further comprising: determining a selection of the second surface in response to the display of the second surface parallel to the display in the steady state.

3. The computer-implemented method of claim 2, further comprising: in response to determining the selection of the second surface, generating a haptic output at the wearable electronic device.

4. The computer-implemented method of claim 2, wherein determining a selection of the second surface in response to the display of the second surface parallel to the display the steady state further comprise instructions for detecting one or more of: a tap gesture on the second surface, a first touch with a force greater than a predetermined threshold, on the touch-sensitive display, a second touch on the physical crown, a press on the physical crown, and a third touch on a touch-sensitive surface of the wearable electronic device.

5. The computer-implemented method of claim 1, wherein the virtual object is a cube.

6. The computer-implemented method of claim 1, wherein the virtual object is a multi-sided rotatable dial.

7. The computer-implemented method of claim 1, further comprising: associating the second surface with a second data, wherein the first data and the second data are different.

8. The computer-implemented method of claim 1, wherein the speed is determined based on the rate of rotation of the virtual object.

9. The computer-implemented method of claim 1, further comprising: determining a selection of the first surface in response to the display of the first surface-parallel to the display.

10. The computer-implemented method of claim 9, further comprising: in response to a determining a selection of the first surface, generating a haptic output at the wearable electronic device.

11. A computer-implemented method comprising:
displaying, on a touch-sensitive display of a wearable electronic device, a first surface of a plurality of selectable surfaces of a virtual object, the first surface associated with a first data;
detecting rotation of a physical crown of the wearable electronic device;
determining an angular velocity of the physical crown during the detected rotation;
in response to detecting rotation of the physical crown, displaying, on the display, an animation of rotating the virtual object about an axis parallel to the display in a first direction;
and after rotating the virtual object about the axis parallel to the display in the first direction:
in response to a determination that the angular velocity exceeds an angular velocity threshold, displaying, on the display, an animation of continuing to rotate the virtual object about the axis parallel to the display in the first direction to display a second surface of the plurality of selectable surfaces of the virtual object on the display, the second surface displayed parallel to the display while in a steady state; and
in response to a determination that the angular velocity is below the angular velocity threshold, displaying, on the display, an animation of rotating the virtual object about the axis parallel to the display in a second direction that is opposite to the first direction to display the first surface of the plurality of selectable surfaces of the virtual object on the display, the first surface displayed parallel to the display while in the steady state.

12. The computer-implemented method of claim 11, further comprising: determining a selection of the second surface in response to the display of the second surface parallel to the display in the steady state.

13. The computer-implemented method of claim 12, further comprising: in response to determining the selection of the second surface, generating a haptic output at the wearable electronic device.

14. The computer-implemented method of claim 12, wherein determining a selection of the second surface in response to the display of the second surface parallel to the display the steady state further comprise instructions for detecting one or more of: a tap gesture on the second surface, a first touch with a force greater than a predetermined threshold, on the touch-sensitive display, a second touch on the physical crown, a press on the physical crown, and a third touch on a touch-sensitive surface of the wearable electronic device.

15. The computer-implemented method of claim 11, wherein the virtual object is a cube.

16. The computer-implemented method of claim 11, wherein the virtual object is a multi-sided rotatable dial.

17. The computer-implemented method of claim 11, further comprising: associating the second surface with a second data, wherein the first data and the second data are different.

18. The computer-implemented method of claim 11, wherein the angular velocity is determined based on the rate of rotation of the virtual object.

19. The computer-implemented method of claim 11, further comprising: determining a selection of the first surface in response to the display of the first surface-parallel to the display.

20. The computer-implemented method of claim 19, further comprising: in response to a determining a selection of the first surface, generating a haptic output at the wearable electronic device.

21. A non-transitory computer-readable storage medium comprising instructions for:
displaying a first surface of a plurality of selectable surfaces of a virtual object on a touch-sensitive display of a wearable electronic device, the first surface associated with a first data;
detecting rotation of a physical crown of the wearable electronic device;
determining a speed, wherein the speed is based on an angular velocity of the physical crown during the detected rotation;
in response to detecting rotation of the physical crown, displaying, on the display, an animation of rotating the virtual object about an axis parallel to the display in a first direction;
and after rotating the virtual object about the axis parallel to the display in the first direction:
in response to the speed being determined to exceed a speed threshold, displaying, on the display, an animation of continuing to rotate the virtual object rotating about an axis parallel to the display in the first direction to display a second surface of the plurality of selectable surfaces of the virtual object on the display, the second surface displayed parallel to the display while in a steady state; and in response to a determination that the speed is below the speed threshold, displaying, on the display, an animation of rotating the virtual object about the axis parallel to the display in a second direction that is opposite to the first direction to display the first surface of the plurality of selectable surfaces of the virtual object on the display, the first surface displayed parallel to the display while in the steady state.

22. The non-transitory computer-readable storage medium of claim 21, further comprising instructions for: determining a selection of the second surface in response to the display of the second surface parallel to the display in the steady state.

23. The non-transitory computer-readable storage medium of claim 22, further comprising instructions for: in response to determining the selection of the second surface, generating a haptic output at the wearable electronic device.

24. The non-transitory computer-readable storage medium of claim 22, wherein determining a selection of the second surface in response to the display of the second surface parallel to the display the steady state further comprises instructions for detecting one or more of: a tap gesture on the second surface, a first touch with a force greater than a predetermined threshold, on the touch-sensitive display, a second touch on the physical crown, a press on the physical crown, and a third touch on a touch-sensitive surface of the wearable electronic device.

25. The non-transitory computer-readable storage medium of claim 21, further comprising instructions for: determining a selection of the first surface in response to the display of the first surface parallel to the display.

26. The non-transitory computer-readable storage medium of claim 25, further comprising instructions for: in response to a determining a selection of the first surface, generating a haptic output at the wearable electronic device.

27. The non-transitory computer-readable storage medium of claim 21, wherein the virtual object is a cube.

28. The non-transitory computer-readable storage medium of claim 21, wherein the virtual object is a multi-sided rotatable dial.

29. The non-transitory computer-readable storage medium of claim 21, further comprising instructions for: associating the second surface with a second data, wherein the first data and the second data are different.

30. The non-transitory computer-readable storage medium of claim 21, wherein the speed is determined based on the rate of rotation of the virtual object.

31. A non-transitory computer-readable storage medium comprising instructions for:
displaying, on a touch-sensitive display of a wearable electronic device, a first surface of a plurality of selectable surfaces of a virtual object, the first surface associated with a first data;
detecting rotation of a physical crown of the wearable electronic device;
determining an angular velocity of the physical crown during the detected rotation;
in response to detecting rotation of the physical crown, displaying, on the display, an animation of rotating the virtual object about an axis parallel to the display in a first direction; and
after rotating the virtual object about the axis parallel to the display in the first direction:

in response to a determination that the angular velocity exceeds an angular velocity threshold, displaying, on the display, an animation of continuing to rotate the virtual object about the axis parallel to the display in the first direction to display a second surface of the plurality of selectable surfaces of the virtual object on the display, the second surface displayed parallel to the display while in a steady state; and in response to a determination that the angular velocity is below the angular velocity threshold, displaying, on the display, an animation of rotating the virtual object about the axis parallel to the display in a second direction that is opposite to the first direction to display the first surface of the plurality of selectable surfaces of the virtual object on the display, the first surface displayed parallel to the display while in the steady state.

32. The non-transitory computer-readable storage medium of claim 31, wherein the physical crown is a mechanical crown.

33. The non-transitory computer-readable storage medium of claim 31, further comprising instructions for: determining a selection of the second surface in response to the display of the second surface parallel to the display in the steady state.

34. The non-transitory computer-readable storage medium of claim 33, further comprising instructions for: in response to determining the selection of the second surface, generating a haptic output at the wearable electronic device.

35. The non-transitory computer-readable storage medium of claim 33, wherein determining a selection of the second surface in response to the display of the second surface parallel to the display the steady state further comprise instructions for detecting one or more of: a tap gesture on the second surface, a first touch with a force greater than a predetermined threshold, on the touch-sensitive display, a second touch on the physical crown, a press on the physical crown, and a third touch on a touch-sensitive surface of the wearable electronic device.

36. The non-transitory computer-readable storage medium of claim 31, wherein the virtual object is a cube.

37. The non-transitory computer-readable storage medium of claim 31, wherein the virtual object is a multi-sided rotatable dial.

38. The non-transitory computer-readable storage medium of claim 31, further comprising instructions for: associating the second surface with a second data, wherein the first data and the second data are different.

39. The non-transitory computer-readable storage medium of claim 31, wherein the angular velocity is determined based on the rate of rotation of the virtual object.

40. The non-transitory computer-readable storage medium of claim 31, further comprising instructions for: determining a selection of the first surface in response to the display of the first surface-parallel to the display.

41. The non-transitory computer-readable storage medium of claim 40, further comprising instructions for: in response to a determining a selection of the first surface, generating a haptic output at the wearable electronic device.

42. An electronic device comprising:
one or more processors;
a physical crown operatively coupled to the one or more processors; and
a touch-sensitive display operatively coupled to the one or more processors, the one or more processors configured for:

displaying a first surface of a plurality of selectable surfaces of a virtual object on a touch-sensitive display of a wearable electronic device, the first surface associated with a first data;

detecting rotation of a physical crown of the wearable electronic device;

determining a speed, wherein the speed is based on an angular velocity of the physical crown during the detected rotation;

in response to detecting rotation of the physical crown, displaying, on the display, an animation of rotating the virtual object about an axis parallel to the display in a first direction; and after rotating the virtual object about the axis parallel to the display in the first direction:

in response to the speed being determined to exceed a speed threshold, displaying, on the display, an animation of continuing to rotate the virtual object rotating about an axis parallel to the display in the first direction to display a second surface of the plurality of selectable surfaces of the virtual object on the display, the second surface displayed parallel to the display while in a steady state; and in response to a determination that the speed is below the speed threshold, displaying, on the display, an animation of rotating the virtual object about the axis parallel to the display in a second direction that is opposite to the first direction to display the first surface of the plurality of selectable surfaces of the virtual object on the display, the first surface displayed parallel to the display while in the steady state.

43. The electronic device of 42, further comprising: determining a selection of the second surface in response to the display of the second surface parallel to the display in the steady state.

44. The electronic device of claim 43, further comprising: in response to determining the selection of the second surface, generating a haptic output at the wearable electronic device.

45. The electronic device of claim 43, wherein determining a selection of the second surface in response to the display of the second surface parallel to the display the steady state further comprise instructions for detecting one or more of: a tap gesture on the second surface, a first touch with a force greater than a predetermined threshold, on the touch-sensitive display, a second touch on the physical crown, a press on the physical crown, and a third touch on a touch-sensitive surface of the wearable electronic device.

46. The electronic device of claim 42, wherein the virtual object is a cube.

47. The electronic device of claim 42, wherein the virtual object is a multi-sided rotatable dial.

48. The electronic device of claim 42, further comprising: associating the second surface with a second data, wherein the first data and the second data are different.

49. The electronic device of claim 42, wherein the speed is determined based on the rate of rotation of the virtual object.

50. The electronic device of claim 42, further comprising: determining a selection of the first surface in response to the display of the first surface-parallel to the display.

51. The electronic device of claim 50, further comprising: in response to a determining a selection of the first surface, generating a haptic output at the wearable electronic device.

52. An electronic device comprising:
one or more processors;
a physical crown operatively coupled to the one or more processors; and
a touch-sensitive display operatively coupled to the one or more processors, the one or more processors configured for:

displaying, on a touch-sensitive display of a wearable electronic device, a first surface of a plurality of selectable surfaces of a virtual object, the first surface associated with a first data;

detecting rotation of a physical crown of the wearable electronic device;

determining an angular velocity of the physical crown during the detected rotation;

in response to detecting rotation of the physical crown, displaying, on the display, an animation of rotating the virtual object about an axis parallel to the display in a first direction; and after rotating the virtual object about the axis parallel to the display in the first direction:

in response to a determination that the angular velocity exceeds an angular velocity threshold, displaying, on the display, an animation of continuing to rotate the virtual object about the axis parallel to the display in the first direction to display a second surface of the plurality of selectable surfaces of the virtual object on the display, the second surface displayed parallel to the display while in a steady state; and in response to a determination that the angular velocity is below the angular velocity threshold, displaying, on the display, an animation of rotating the virtual object about the axis parallel to the display in a second direction that is opposite to the first direction to display the first surface of the plurality of selectable surfaces of the virtual object on the display, the first surface displayed parallel to the display while in the steady state.

53. The electronic device of 52, further comprising: determining a selection of the second surface in response to the display of the second surface parallel to the display in the steady state.

54. The electronic device of claim 53, further comprising: in response to determining the selection of the second surface, generating a haptic output at the wearable electronic device.

55. The electronic device of claim 53, wherein determining a selection of the second surface in response to the display of the second surface parallel to the display the steady state further comprise instructions for detecting one or more of: a tap gesture on the second surface, a first touch with a force greater than a predetermined threshold, on the touch-sensitive display, a second touch on the physical crown, a press on the physical crown, and a third touch on a touch-sensitive surface of the wearable electronic device.

56. The electronic device of claim 52, wherein the virtual object is a cube.

57. The electronic device of claim 52, wherein the virtual object is a multi-sided rotatable dial.

58. The electronic device of claim 52, further comprising: associating the second surface with a second data, wherein the first data and the second data are different.

59. The electronic device of claim 52, wherein the angular velocity is determined based on the rate of rotation of the virtual object.

60. The electronic device of claim 52, further comprising: determining a selection of the first surface in response to the display of the first surface-parallel to the display.

61. The electronic device of claim 60, further comprising: in response to a determining a selection of the first surface, generating a haptic output at the wearable electronic device.

* * * * *

UNITED STATES PATENT AND TRADEMARK OFFICE
CERTIFICATE OF CORRECTION

PATENT NO. : 10,275,117 B2  
APPLICATION NO. : 14/913350  
DATED : April 30, 2019  
INVENTOR(S) : Nicholas Zambetti et al.

Page 1 of 1

It is certified that error appears in the above-identified patent and that said Letters Patent is hereby corrected as shown below:

In the Claims

Claim 1, Column 14, Line 51, delete "rotation of the wearable electronic device;" and insert -- rotation; --.

Claim 43, Column 19, Line 33, after "of", insert -- claim --.

Claim 53, Column 20, Line 38, after "of", insert -- claim --.

Signed and Sealed this  
Twenty-second Day of October, 2019

Andrei Iancu  
*Director of the United States Patent and Trademark Office*